US011309806B2

(12) United States Patent
Leu

(10) Patent No.: US 11,309,806 B2
(45) Date of Patent: *Apr. 19, 2022

(54) MODIFIED PULSE-WIDTH MODULATION CONTROL ZERO-VOLTAGE-SWITCHING POWER INVERSION CIRCUITS

(71) Applicant: Ching-Shan Leu, Taoyuan (TW)

(72) Inventor: Ching-Shan Leu, Taoyuan (TW)

(*) Notice: Subject to any disclaimer, the term of this patent is extended or adjusted under 35 U.S.C. 154(b) by 0 days.

This patent is subject to a terminal disclaimer.

(21) Appl. No.: 17/137,332

(22) Filed: Dec. 29, 2020

(65) Prior Publication Data

US 2021/0218347 A1 Jul. 15, 2021

(30) Foreign Application Priority Data

Jan. 9, 2020 (TW) ................... 109100709

(51) Int. Cl.
*H02M 7/5387* (2007.01)
*H02M 1/08* (2006.01)
*H02M 1/00* (2006.01)

(52) U.S. Cl.
CPC ....... *H02M 7/53873* (2013.01); *H02M 1/083* (2013.01); *H02M 1/0058* (2021.05); *H02M 7/53878* (2021.05)

(58) Field of Classification Search
CPC ............... H02M 7/4835; H02M 7/483; H02M 7/53871; H02M 3/3353; H02M 1/0054; H02M 1/0058; H02M 3/33569; H02M 3/33584; H02M 3/33576
See application file for complete search history.

(56) References Cited

U.S. PATENT DOCUMENTS

| 5,523,936 | A | * | 6/1996 | Leu | ........................... G05F 1/40 323/282 |
| 5,640,318 | A | * | 6/1997 | Leu | ..................... H02M 3/3353 363/131 |
| 5,734,258 | A | * | 3/1998 | Esser | .................. H02M 3/1582 323/224 |
| 5,896,282 | A | * | 4/1999 | Wu | ................... H02M 3/33561 363/96 |
| 5,907,479 | A | * | 5/1999 | Leu | ..................... H02M 3/3353 363/16 |
| 6,208,529 | B1 | * | 3/2001 | Davidson | .......... H02M 3/33569 363/132 |
| 6,927,987 | B2 | * | 8/2005 | Farrington | ........ H02M 3/33569 363/56.02 |
| 6,977,488 | B1 | * | 12/2005 | Nogawa | .............. H02M 3/1582 323/222 |

(Continued)

*Primary Examiner* — Yusef A Ahmed
(74) *Attorney, Agent, or Firm* — CKC & Partners Co., LLC

(57) ABSTRACT

To disclose several zero-voltage-switching (ZVS) power inversion circuits, a modified pulse-width modulation control scheme is employed. It includes two driver-signal pairs. Each pair has a near 50% duty ratio driver signal and a pulse-width modulation driver signal. Because the combination timing waveform of the two driver signals of each pair resembles to a letter T, the control scheme is thus briefly named as double T (TT) control. In addition to achieving zero-voltage switching performance for high frequency operation, the disclosed power inversion circuits can alleviate the potential shoot-through problem existed in phase-shift control full-bridge power inversion circuits. Consequently, reliability performance can be improved.

10 Claims, 17 Drawing Sheets

(56) References Cited

U.S. PATENT DOCUMENTS

| | | | | |
|---|---|---|---|---|
| 7,154,250 | B2* | 12/2006 | Vinciarelli | H02M 3/1582 323/240 |
| 7,551,459 | B1* | 6/2009 | Wittenbreder, Jr. | H02M 3/33576 363/21.06 |
| 7,609,532 | B1* | 10/2009 | Schutten | H02M 7/53871 363/17 |
| 9,647,557 | B2* | 5/2017 | Milanesi | H02M 3/1584 |
| 10,483,862 | B1* | 11/2019 | Cook | H02M 1/44 |
| 10,804,808 | B1* | 10/2020 | Fu | H02M 3/33584 |
| 10,826,405 | B1* | 11/2020 | Bala | H02M 3/33507 |
| 11,011,936 | B2* | 5/2021 | Costinett | H02M 1/083 |
| 11,038,374 | B2* | 6/2021 | Prabhala | H02J 50/12 |
| 2002/0159280 | A1* | 10/2002 | Zhu | H02M 1/34 363/98 |
| 2004/0022075 | A1* | 2/2004 | Perry | H02M 3/33592 363/21.01 |
| 2004/0212357 | A1* | 10/2004 | Crocker | H02M 3/1582 323/282 |
| 2005/0078491 | A1* | 4/2005 | Song | H02M 3/33569 363/17 |
| 2008/0025051 | A1* | 1/2008 | Leu | H02M 3/33576 363/20 |
| 2008/0062724 | A1* | 3/2008 | Feng | H02J 7/35 363/17 |
| 2009/0257254 | A1* | 10/2009 | Leu | H02M 1/34 363/40 |
| 2010/0226154 | A1* | 9/2010 | Leu | H02M 1/34 363/106 |
| 2010/0266875 | A1* | 10/2010 | Somogye | G05F 1/10 429/7 |
| 2011/0101951 | A1* | 5/2011 | Zhang | H02M 3/33592 323/305 |
| 2011/0199802 | A1* | 8/2011 | Leu | H02M 1/34 363/131 |
| 2011/0215851 | A1* | 9/2011 | Oh | H03L 7/06 327/158 |
| 2012/0051108 | A1* | 3/2012 | Leu | H02M 7/217 363/126 |
| 2012/0087157 | A1* | 4/2012 | Huang | H02M 7/5387 363/37 |
| 2013/0308353 | A1* | 11/2013 | Leu | H02M 7/48 363/40 |
| 2013/0314070 | A1* | 11/2013 | Shinohara | H02M 3/158 323/351 |
| 2014/0355311 | A1* | 12/2014 | Biebach | H02M 3/33584 363/17 |
| 2015/0055374 | A1* | 2/2015 | Yamashita | H02M 3/337 363/17 |
| 2015/0098250 | A1* | 4/2015 | Wu | H02M 3/33507 363/17 |
| 2015/0207424 | A1* | 7/2015 | Okamoto | H02M 3/33569 363/17 |
| 2015/0303788 | A1* | 10/2015 | Leu | H02M 7/217 363/84 |
| 2016/0380425 | A1* | 12/2016 | Chapman | H02M 3/33569 363/21.01 |
| 2017/0012452 | A1* | 1/2017 | Kang | H02J 7/00 |
| 2018/0062443 | A1* | 3/2018 | Cho | H02J 50/10 |
| 2018/0304393 | A1* | 10/2018 | Vogel | H02M 3/33546 |
| 2018/0331625 | A1* | 11/2018 | Somani | H02M 1/14 |
| 2019/0146541 | A1* | 5/2019 | Cai | H02M 3/33584 327/540 |
| 2019/0157993 | A1* | 5/2019 | Neuhaus | H02P 6/10 |
| 2019/0173387 | A1* | 6/2019 | Tanaka | H02M 1/08 |
| 2020/0044559 | A1* | 2/2020 | Leu | H02M 7/4837 |
| 2020/0144926 | A1* | 5/2020 | Murakami | H02M 3/337 |
| 2020/0195123 | A1* | 6/2020 | Cai | H02M 3/337 |
| 2020/0251985 | A1* | 8/2020 | Lu | H02M 3/156 |
| 2021/0006149 | A1* | 1/2021 | Zong | H02M 7/483 |
| 2021/0194374 | A1* | 6/2021 | Deng | H02M 1/4241 |

* cited by examiner

MODIFIED PULSE-WIDTH MODULATION CONTROL ZERO-VOLTAGE-SWITCHING POWER INVERSION CIRCUITS

RELATED APPLICATIONS

This application claims priority to Taiwan Application Serial Number 109100709, filed Jan. 9, 2020, which is herein incorporated by reference.

BACKGROUND OF THE INVENTION

Field of Invention

Employing a novel TT control scheme, several ZVS power inversion circuits are disclosed. In addition to achieving zero-voltage switching performance for high frequency operation, TT control converters can alleviate or eliminate the potential shoot-through problem existed in phase-shift control full-bridge converter. Consequently, issue of reliability can be improved.

Description of Related Art

DC-DC converter is widely used in today's electrical device. By using a power inversion circuit cascaded with a rectification circuit and a filter circuit, the DC voltage is inverted to an AC voltage and the AC voltage is then rectified and filtered to the required DC voltage.

Due to low voltage and current stresses on semiconductors, several four-switch power inversion topologies, such as full-bridge and three-level topologies, are widely used for high input-voltage medium-to-high power conversion applications.

FIG. 1(a) and FIG. 1(b) show the circuit diagram of a conventional full-bridge converter and its timing diagram of driver signals, respectively. Two synchronous pulse-width modulation driver signal pairs (Vgs1-Vgs2 and Vgs3-Vgs4) are 180 degree phase-shifted to each other issued by the controller. Although it is a totem pole configuration, there is no potential shoot-through problem on the two series-connected MOSFETs. However, it suffers from high switching loss due to its high frequency hard-switching operation. As a result, high power density is hard to be achieved.

To realize a high power density performance, a phase-shift control scheme was invented to significantly reduce switching loss. As shown in FIG. 1(c), two near 50% duty cycle driver signal pairs with variable phase-shift to each other. A dead-time interval is inserted between two drive signals within each pair and it is utilized to exchange the energies between the inductor and MOSFET output capacitance. Thus, ZVS operation can be achieved and high power density performance can be achieved.

However, it may have a potential shoot-through problem on the two series-connected MOSFETs. To lessen this pitfall, a longer dead-time interval and MOSFET with fast reverse recovery body diode are designed. Due to noise and radiation, however, shoot-through problem is hard to totally avoid under full range operating conditions. Moreover, increasing the required dead-time interval limits the available operating high frequency to achieve high power density performance. In addition, six driver signals (including synchronous rectifier driver signals) have to be issued to achieve high efficiency performance. It complicates the design of the controller.

Accordingly, a simple control scheme having ZVS operation and less potential shoot-through problem on the MOSFETs in the four-switch power inversion topologies is strongly requested. However, it is not explored and becomes the motivation of the present invention.

As shown in FIG. 1(b) and FIG. 1(c), the timing diagrams of traditional symmetrical control scheme and phase-shift control scheme are re-investigated. Although the drive signals have different timing, it can be concluded that voltage waveforms on the transformer primary are identical with equal duty cycle in both control schemes. To obtain same voltage waveform on the transformer primary, accordingly, an alternative TT control scheme is disclosed. Two driver signal pairs (one near 50% duty cycle driver signal and one pulse-width modulated driver signal in each pair) are issued to drive the switches under duty cycle control method.

Due to two PWM signals instead, the potential shoot-through problem on the two push-pull control MOSFETs is reduced to half compared to that of phase-shift control scheme and circuit reliability is upgraded.

Accordingly, the present invention discloses several power inversion circuits to achieve ZVS operation and alleviate/eliminate potential shoot-through problem on the two push-pull type control MOSFETs with simple TT control scheme.

SUMMARY OF THE INVENTION

An object of the present invention is to provide power inversion circuits having zero-voltage switching performance to reduce the switching loss for high frequency operation.

Another object of the present invention is to lessen power inversion circuit having shoot-through problem on two push-pull control MOSFETs. Therefore, further reliability improvements can thus be obtained.

Other objects, advantages, and novel features of the invention will become more apparent from the following detailed description when taken in conjunction with the accompanying drawings.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DETAILED DESCRIPTION OF PREFERRED EMBODIMENTS

Figure 1A:
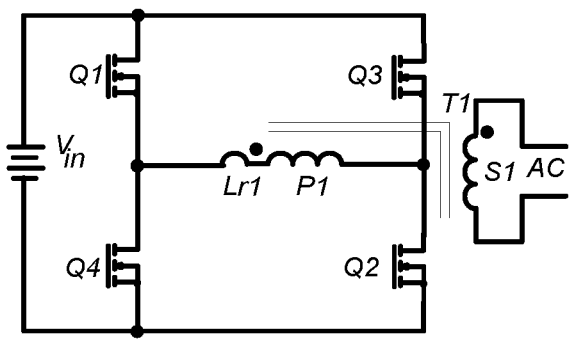
FIG. 1(a), FIG. 1(b), and FIG. 1(c) show the circuit diagram of a single-transformer DC-AC inversion with gate driver timing diagrams of a symmetrical control and a phase-shift control, respectively.
Figure 1B:
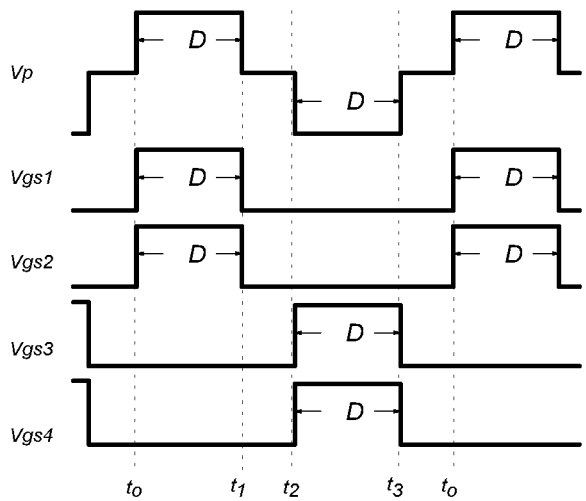

FIG. 1(a) and FIG. 1(b) show the circuit diagram of a conventional full-bridge converter and its timing diagram of driver signals, respectively. Two synchronous pulse-width modulation driver signal pairs with 180 degree phase-shift to each other are issued by the controller. Although it is a totem pole configuration, there is no potential shoot-through problem on the two push-pull control MOSFETs. However, it suffers from high switching loss due to its high frequency hard-switching operation. As a result, high power density is hard to be achieved.

Figure 1C:
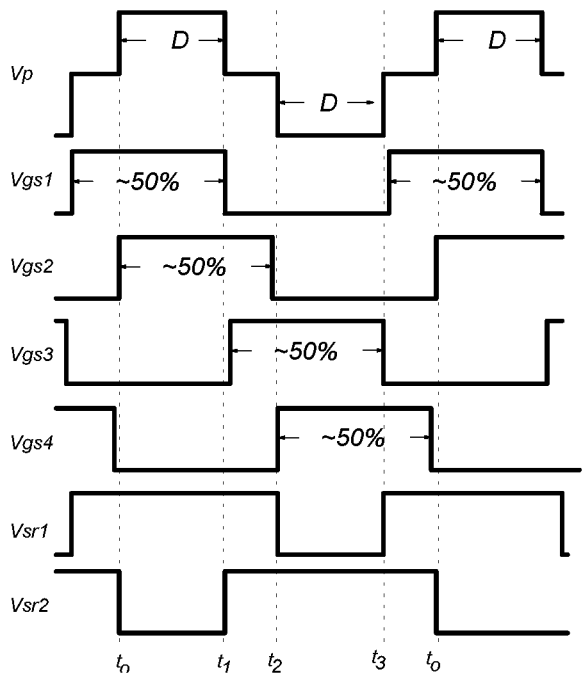

To achieve a high power density performance, a phase-shift control scheme was invented to significantly reduce switching loss. As shown in FIG. 1(c), two near 50% duty cycle driver signal pairs with variable phase-shift to each other. Within each pair, a small dead-time interval is inserted between two push-pull driver signals. Dead-time interval is thus utilized for exchanging the energies between the inductor and MOSFET output capacitance. ZVS operation is thus obtained in wide range operation conditions and high power density performance can be achieved.

However, it may have a potential shoot-through problem on the two push-pull control MOSFETs. To lessen this pitfall, a longer dead-time interval and MOSFET with fast reverse recovery body diode are designed. Due to noise and radiation, however, it is hard to totally avoid under full range operating conditions. Moreover, increasing the required dead-time interval limits the available operating high frequency to achieve high power density performance. In addition, six driver signals (including synchronous rectifier driver signals) have to be issued to achieve high efficiency performance. It complicates the design of the controller.

Accordingly, a simple control scheme having ZVS operation and less potential shoot-through problem on the MOSFETs in the four-switch power inversion topologies is strongly requested. However, it is not explored and becomes the motivation of the present invention.

Referring to FIG. 1(b) and FIG. 1(c), the timing diagrams of the traditional symmetrical control scheme and the phase-shift control scheme are re-investigated. Although the timing of the drive signals is different, the voltage waveforms on the transformer primary Vp are identical in both control schemes. To obtain the same voltage waveform Vp, two driver signal pairs (one near 50% duty cycle driver signal and one pulse-width modulated driver signal in each pair) can be also applied instead. Due to the timing of the driver signals resembles to letter T, the disclosed control scheme is thus named as TT control. Accordingly, four possible combinations of the timing diagram of the TT control can be derived as shown in FIG. 2(a) to FIG. 2(d). These signals are issued to drive the switches under variable duty cycle control instead of the variable phase-shift control.

Due to two PWM signals instead, the potential shoot-through problem on the two push-pull control MOSFETs is reduced to half compared to that of phase-shift control scheme and circuit reliability is upgraded.

Figure 2A:
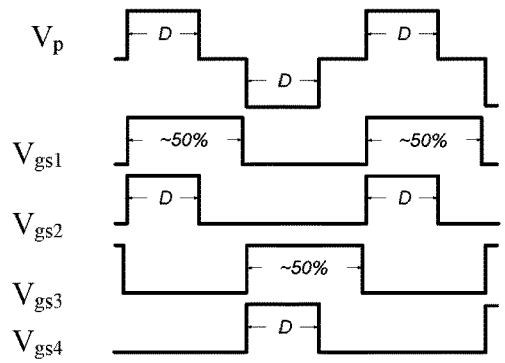
FIG. 2(a), FIG. 2(b), FIG. 2(c), and FIG. 2(d) respectively show four combinations of the gate driver timing diagram according to the disclosed TT control scheme of the present invention.
Figure 2B:
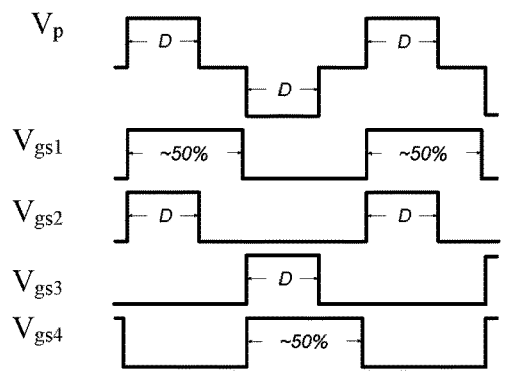
Figure 2C:
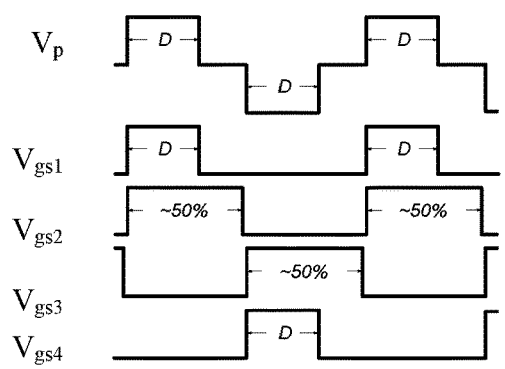
Figure 2D:
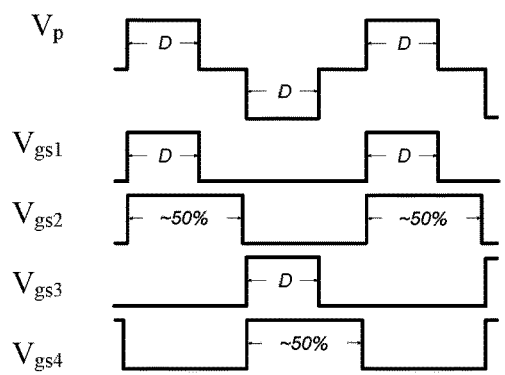
Figure 3A:
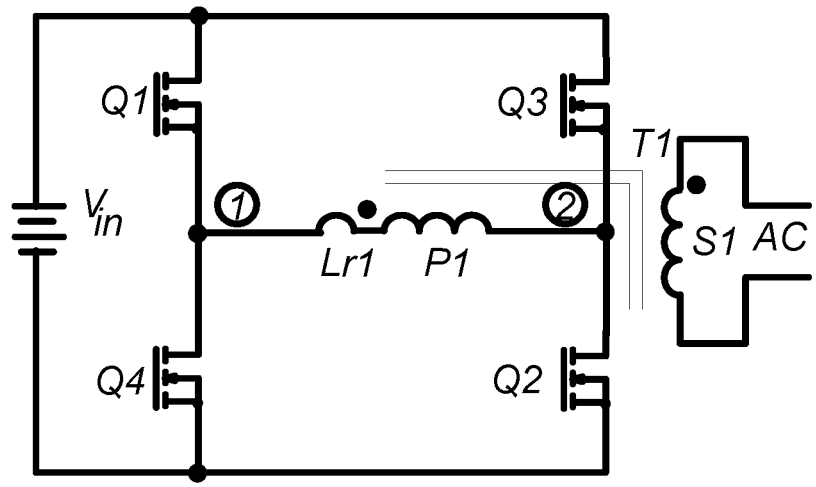
FIG. 3(a) and FIG. 3(b) respectively show a DC-AC power inversion circuit diagram with its driver signal timing diagram as the first example according to the first embodiment of the present invention.
Figure 3B:
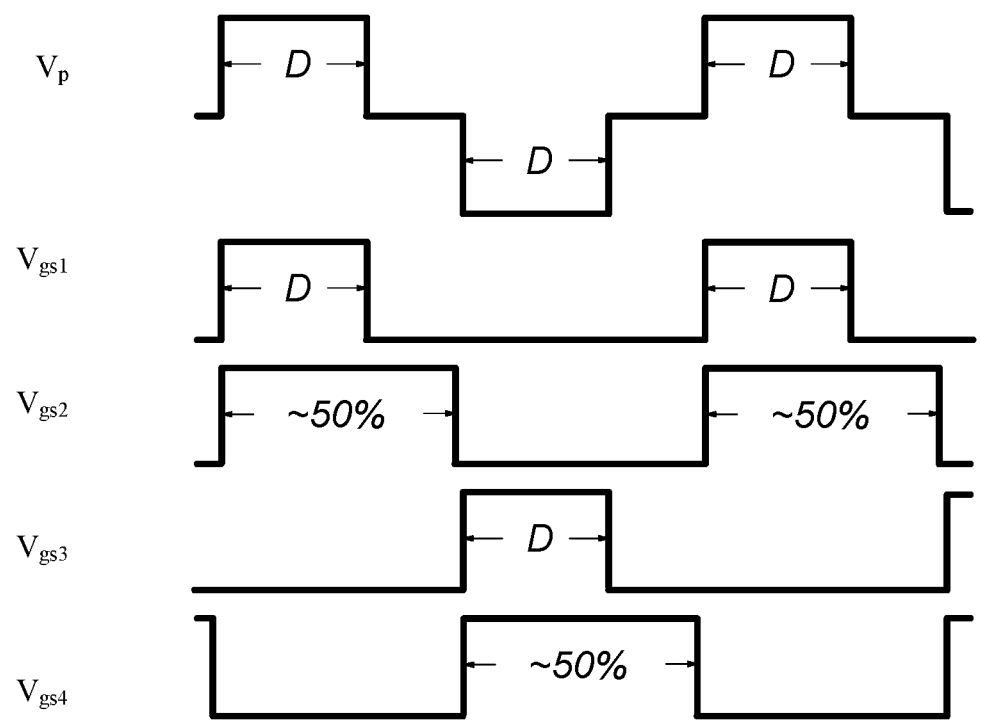

FIG. 3(a) and FIG. 3(b) show a single-transformer DC-AC power inversion circuit with its one of the four driver signal timing diagrams of TT control as shown in FIG. 2(a) to FIG. 2(d) to be assigned to switches as the first example of the first embodiment of the present invention, respectively.

Referring to FIG. 3(a), a voltage source Vin provides a DC input to a power inversion circuit which includes two series circuits connected in parallel with the DC input. The first series circuit includes a first switch Q1, a first transformer primary Lr1-P1, and a second switch Q2 sequentially connected in series. The second series circuit includes a third switch Q3, a first transformer primary Lr1-P1, and a fourth switch Q4 sequentially connected in series. The transformer T1 has one primary windings P1-Lr1 and at least one secondary winding S1. The dot terminal of the first primary winding P1-Lr1 is connected to a center node of the first switch Q1 and the fourth switch Q4. The non-dot terminal of the first primary winding P1-Lr1 is connected to a center node of the third switch Q3 and the second switch Q2. Lr1 represents the leakage inductance or an external inductor.

A controller (not shown) will issue two interleaved pairs of gate driver signal applied to the power inversion circuit. Each pair has two synchronized gate driver signals with one pulse-width-modulation signal (D) and one near 50% duty cycle signal (~50%). As shown in FIG. 3(b), four gate driver signals (D, ~50%, D, ~50%) are assigned to turn-on and turn-off the Q1, Q2, Q3, and Q4, respectively.

At least one transformer secondary winding are magnetically coupled to transformer primary windings. As a result of the sequential operation of Q1-Q2 and Q3-Q4, an AC voltage will be issued that will be available from the secondary winding. If a DC output voltage is required, an external rectifier and filter circuits are added in the transformer secondary (not shown).

Although the power inversion circuit as shown in FIG. 3(a) can be operated with either one of the four different driver signals assigned to the switches as shown in FIG. 2(a) to FIG. 2(d), it will share the same operating principle. Accordingly, it will be only described by using the circuit as shown in FIG. 3(a) with driver signals assigned to the switches in FIG. 3(b), as the first example of the first embodiment of the present invention.

FIG. 4(a) to FIG. 4(h) show eight equivalent circuits to each operating stages under stead-state operating conditions according to the first example of the first embodiment of the present invention. Several key voltage and current waveforms are obtained by running Simplis program (a computer simulation tool for power electronics circuit) as shown in FIG. 5. It can be seen that all four switches are operated with ZVS. Moreover, only the turn-off of switch Q2 and Q4 (two near 50% control switches) may have shoot-through problem instead of all four switches in phase-shift control scheme.

Figure 4A:
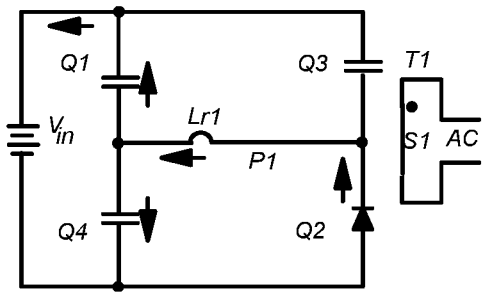
FIG. 4(a) and FIG. 4(h) show eight equivalent circuits of the DC-AC power inversion circuit in FIG. 3(a) under steady-state operating conditions when the switches are turned on and turned off, respectively.
Figure 5:
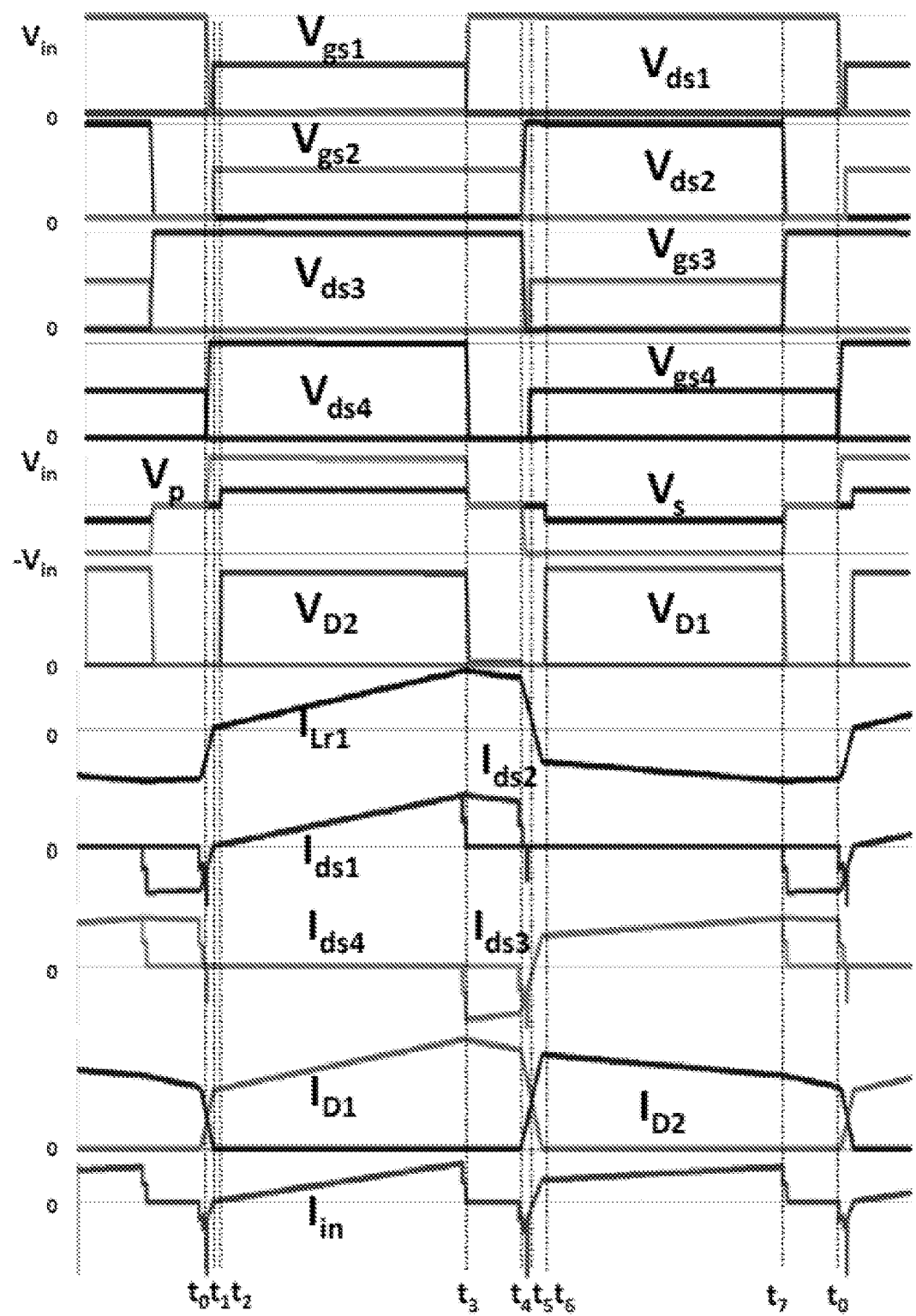
FIG. 5 shows several key voltage and current waveforms of the DC-AC power inversion circuit in FIG. 3(a) under steady state operating conditions.

Referring to FIG. 4(a) and [$t_0$-$t_1$] time interval in FIG. 5, $V_{ds1}$=$V_{in}$, $V_{ds2}$=0, $V_{ds3}$=$V_{in}$, and $V_{ds4}$=0 before $t_0$. At $t_0$, the near 50% duty cycle drive signal issued by the controller turns Q4 off. Therefore, $i_{Lr1}$ is used to charge $C_{oss4}$. If inductance energy is large enough and a proper dead-time interval is designed, $V_{ds4}$ will rise to input DC input voltage Vin and decrease $V_{ds1}$ to 0. Accordingly, the voltage across primary winding P1-Lr1 increases to Vin resulting in forward-biasing the secondary rectifiers (not shown) to commutate load current. The transformer secondary S1 and transformer primary P1 are thus shorted.

Figure 4B:
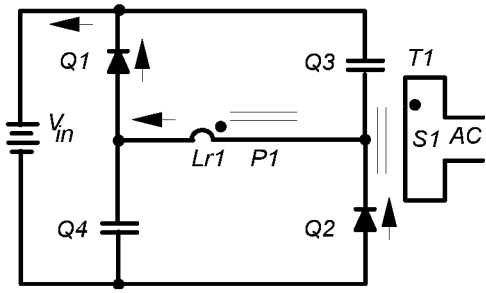

Referring to FIG. 4(b) and [$t_1$-$t_2$] time interval in FIG. 5, $V_{ds1}$=0, $V_{ds2}$=0, $V_{ds3}$=$V_{in}$, and $V_{ds4}$=$V_{in}$ before $t_1$. At $t_1$, the drive signals issued by the controller turn-on both Q1 and Q2 under ZVS operation. At $t_2$, the current commutation between two rectifiers is completed.

Figure 4C:
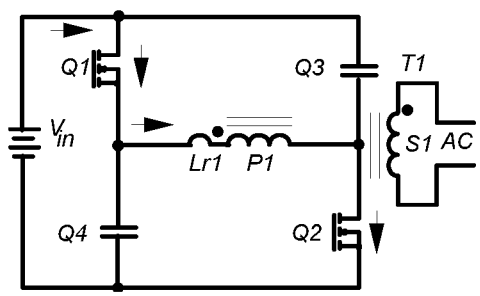

Referring to FIG. 4(c) and [$t_2$-$t_3$] time interval in FIG. 5, both Q1 and Q2 keep turning-on. Vin(+)-Q1-Lr1-P1-Q2-Vin(−) is established to provide input voltage to the transformer primary P1-Lr1. Input powers are thus transferred to transformer secondary.

Figure 4D:
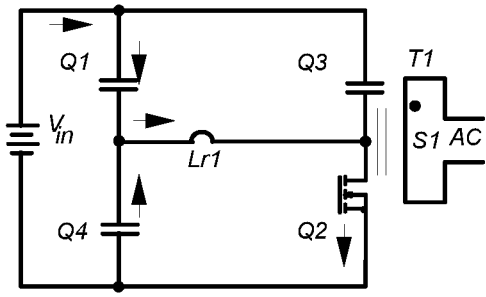

Referring to FIG. 4(d) and [$t_3$-$t_4$] time interval in FIG. 5, the pulse width modulation signal D issued by the controller turns Q1 off at $t_3$, but keeps Q2 on. $i_{Lr1}$ is used to charge $C_{oss1}$ and $V_{ds1}$ will be clamped to input voltage. Due to the forward-biased of body diode of Q4, the transformer primary is thus shorted and the Lr1 energy is reserved.

Figure 4E:
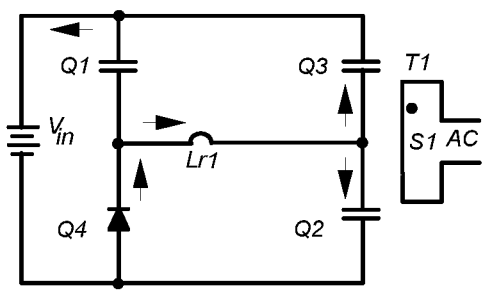

Referring to FIG. 4(e) and [$t_4$-$t_5$] time interval in FIG. 5, $V_{ds1}$=$V_{in}$, $V_{ds2}$=0, $V_{ds3}$=$V_{in}$, and $V_{ds4}$=0 before $t_4$. At, $t_4$, the near 50% duty cycle drive signal issued by the controller turns Q2 off. Therefore, $i_{Lr1}$ is used to charge $C_{oss2}$. If inductance energy is large enough and a proper dead-time interval is designed, $V_{ds2}$ will rise to $V_{in}$ and decrease $V_{ds3}$ to 0. Accordingly, the voltage across primary winding P1-Lr1 increases to Vin resulting in forward-biasing the secondary rectifiers (not shown) to commutate load current. The transformer secondary S1 and transformer primary P1 are thus shorted.

Figure 4F:
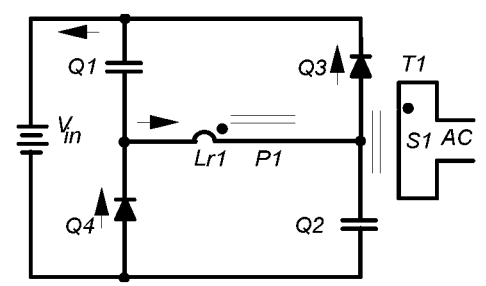

Referring to FIG. 4(f) and [$t_5$-$t_6$] time interval in FIG. 5, $V_{ds1}$=$V_{in}$, $V_{ds2}$=$V_{in}$, $V_{ds3}$=0, and $V_{ds4}$=0 before $t_5$. At $t_5$, the drive signals issued by the controller turn-on both Q3 and Q4 under ZVS operation. At $t_6$, the current commutation is completed.

Figure 4G:
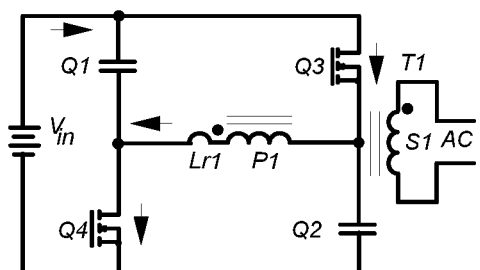

Referring to FIG. 4(g) and [$t_6$-$t_7$] time interval in FIG. 5, both Q3 and Q4 keep turning-on. Vin(+)-Q3-P1-Lr1-Q4-Vin(−) is established to provide input voltage to the transformer primary P1-Lr1. Input powers are thus transferred to transformer secondary.

Figure 4H:
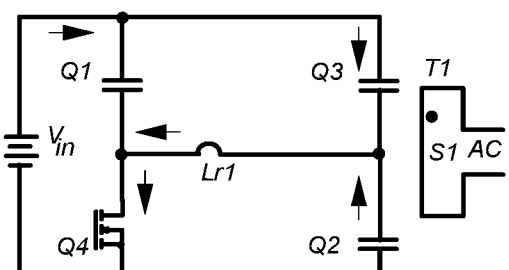

Referring to FIG. 4(h) and [$t_7$-$t_0$] time interval in FIG. 5, the pulse width modulation signal D issued by the controller turns Q3 off at $t_7$, but keeps Q4 on. $I_{Lr1}$ is used to charge $C_{oss3}$ and $V_{ds3}$ will be increased to input voltage. Due to the forward-biased of body diode of Q2, the transformer primary P1 is thus shorted and the Lr1 energy is reserved.

Figure 6A:
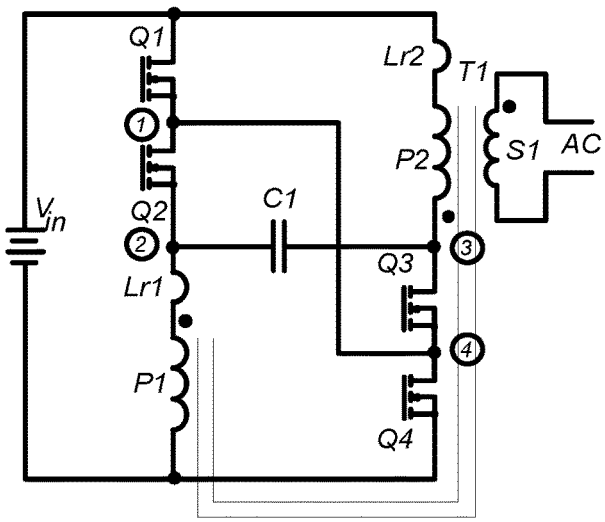
FIG. 6(a) and FIG. 6(b) show a single-transformer DC-AC power inversion circuit diagram with its gate driver timing diagram as the first example of the second embodiment according to the present invention, respectively.
Figure 6B:
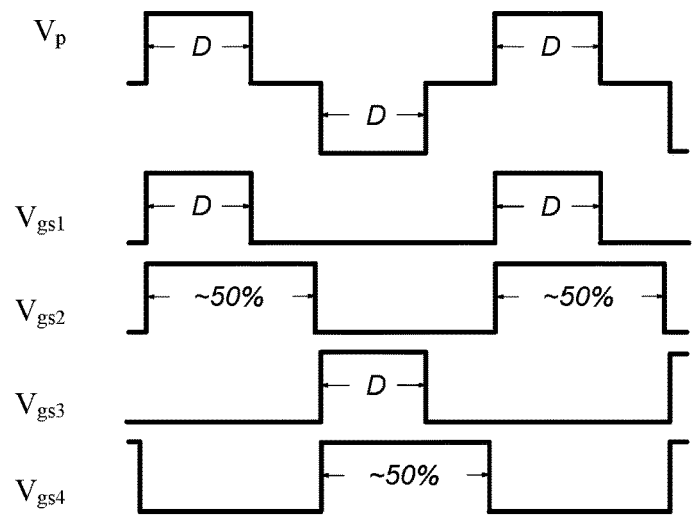

FIG. 6(a) and FIG. 6(b) show a single-transformer DC-AC power inversion circuit with its one of the four driver signal timing diagrams of TT control as shown in FIG. 2(a) to FIG. 2(d) to be assigned to switches as the first example of the second embodiment of the present invention. The power inversion circuit comprises two series circuits and one capacitor.

Referring to FIG. 6(a), a voltage source Vin provides a DC input to a power inversion circuit which includes two series circuits connected in parallel with the DC input. The first series circuit includes a first switch pair Q1-Q2 and a first transformer primary Lr1-P1 sequentially connected in series. The second series circuit includes a second transformer primary Lr2-P2 and a second switch pair Q3-Q4 sequentially connected in series. A transformer T1 has two transformer primaries (Lr1-P1 and Lr2-P2) and at least one transformer secondary (S1). The primary windings Lr1-P1 and Lr2-P2 have equal number of turn. Lr1 and Lr2 represent the leakage inductance or an individual external inductor to the P1 and P2, respectively. The non-dot terminals of the first and second primary windings P1 and P2 are connected to the negative and the positive terminals of the DC input voltage Vin, respectively. A center-node of the first switch pair and a center-node of the second switch pair are connected together. The two terminals of a capacitor C1 are connected to the dot terminals of the first primary P1 and second primary P2, respectively. Due to the equal number of turn and opposite polarity to P1 and P2, the average voltage across capacitor C1 is equal to the DC input voltage.

A controller (not shown) will issue two interleaved pairs of gate driver signal applied to the power inversion circuit. Each pair has two synchronized gate driver signals with one pulse-width-modulation signal (D) and one near 50% duty cycle signal (~50%). Referring to FIG. 2(a), FIG. 2(b), FIG. 2(c), and FIG. 2(d), four sets of gate driver signals can be assigned to control the switches. As shown in FIG. 6(b), four gate driver signals (D, ~50%, D, ~50%) are assigned to turn-on and turn-off the Q1, Q2, Q3, and Q4, respectively. As a result of the sequential operation of Q1, Q2, Q3, and Q4, an AC voltage will be generated that will be available from the secondary winding.

Figure 6C:
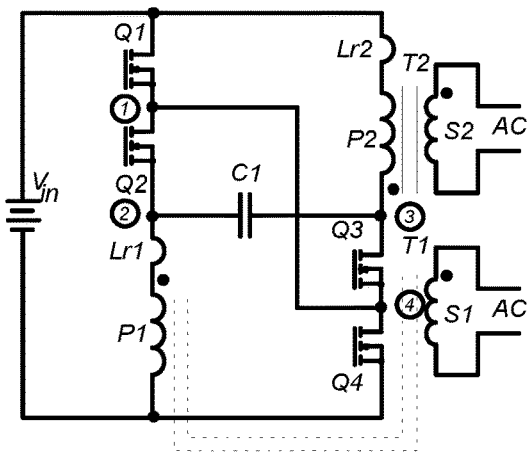
FIG. 6(c) shows a dual-transformer DC-AC power inversion circuit diagram as the second example according to the second embodiment of the present invention.

The second example of the second embodiment to that shown in FIG. 6(a) is depicted in FIG. 6(c). The single transformer T1 has been replaced with dual transformers T1 and T2 for high output power applications. Primary winding Lr1-P1 and at least one secondary winding S1 are coupled to the first transformer T1 while primary winding Lr2-P2 and at least one secondary winding S2 are coupled to the second transformer T2. Secondary windings S1 and S2 may be connected in parallel or in series to generate the required AC voltage.

Although the power inversion circuits as shown in FIG. 6(a) and FIG. 6(c) are operated with one or two transformers for different output power applications, these circuits will share the same operating principle with either one of the four different driver signals assigned to the switches as shown in FIG. 2(a) to FIG. 2(d). Accordingly, it will be only described by using the circuit as shown in FIG. 6(a) with driver signals assigned to the switches in FIG. 6(b), the first example of the second embodiment of the present invention.

FIG. 7(a) to FIG. 7(h) show eight equivalent circuits to each operating stages under stead-state operating conditions according to the first example of the second embodiment of the present invention. Several key voltage and current waveforms are obtained by running Simplis program (a computer simulation tool for power electronics circuit) as shown in FIG. 8. It can be seen that all four switches are operated with ZVS. Moreover, only the turn-off of switch Q2 and Q4 (two near 50% control switches) may have shoot-through problem instead of all four switches in phase-shift control scheme.

Figure 7A:
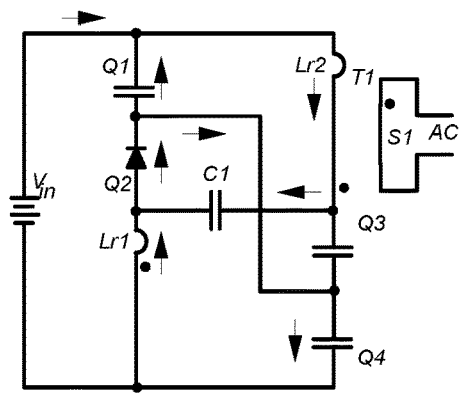
FIG. 7(a) to FIG. 7(h) show eight equivalent circuits of the DC-AC power inversion circuit in FIG. 6(a) under steady-state operating conditions when the switches are turned on and turned off, respectively.
Figure 8:
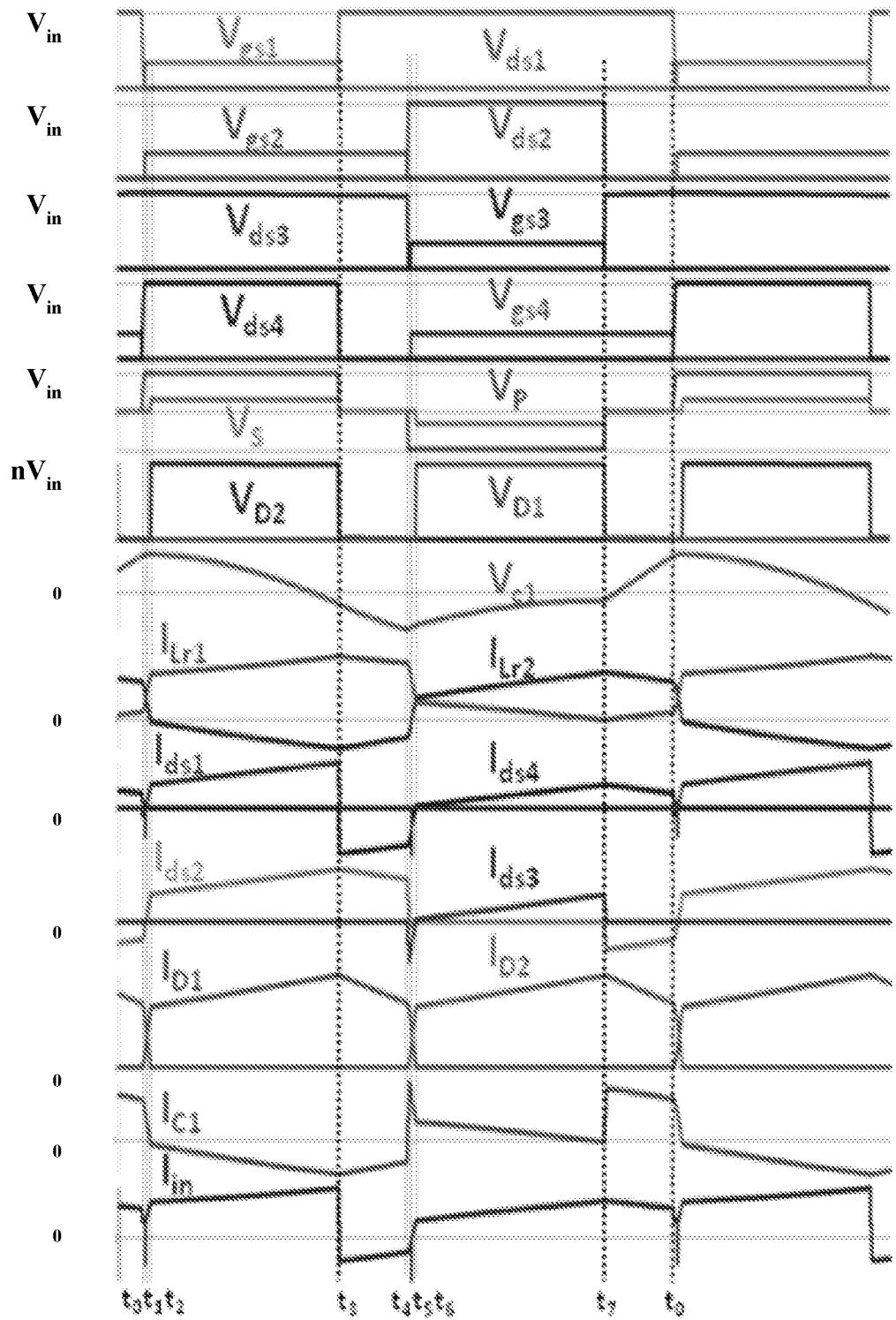
FIG. 8 shows several key voltage and current waveforms of the DC-AC power inversion circuit in FIG. 6(a) under steady state operating conditions.

Referring to FIG. 7(a) and [$t_0$-$t_1$] time interval in FIG. 8, $V_{ds1}$=$V_{in}$, $V_{ds2}$=0, $V_{ds3}$=$V_{in}$, and $V_{ds4}$=0 before $t_0$. At $t_0$, the near 50% duty cycle drive signal issued by the controller turns Q4 off. Therefore, $i_{Lr1}$ is used to charge $C_{oss4}$ and $i_{Lr2}$ is used to discharge $C_{oss1}$. If inductance energies are large enough and a proper dead-time interval is designed, $V_{ds4}$ will rise to $V_{in}$ via the body diode of $D_{Q1}$ and $V_{ds1}$ is decreased to 0. Accordingly, the voltage across primary winding P1-Lr1 increases to Vin resulting in forward-biasing the secondary rectifiers (not shown) to commutate load current. The transformer secondary S1 and transformer primary P1 are thus shorted.

Figure 7B:
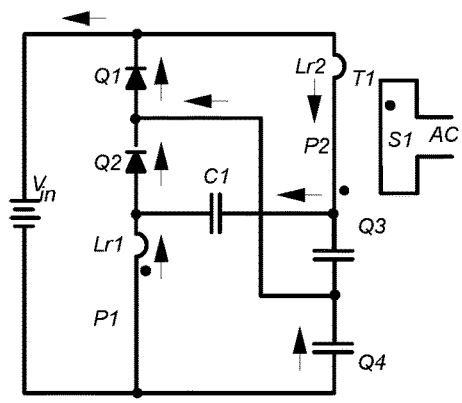

Referring to FIG. 7(b) and [$t_1$-$t_2$] time interval in FIG. 8, $V_{ds1}$=0, $V_{ds2}$=0, $V_{ds3}$=$V_{in}$, and $V_{ds4}$=$V_{in}$ before $t_1$. At $t_1$, the drive signals issued by the controller turn-on both Q1 and Q2 under ZVS operation. At $t_2$, the current commutation between two rectifiers is completed.

Figure 7C:
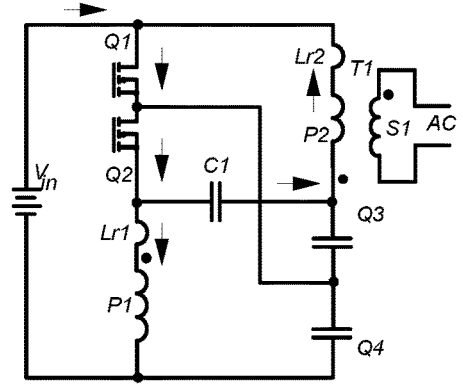

Referring to FIG. 7(c) and [$t_2$-$t_3$] time interval in FIG. 8, both Q1 and Q2 keep turning-on. Two circuit loops, Vin(+)-Q1-Q2-Lr1-P1-Vin(−) and VC1(+)-P2-Lr2-Q1-Q2-VC1(−), are established to provide input voltage to the transformer primaries Lr1-P1 and Lr2-P2, respectively. Input powers are thus transferred to transformer secondary.

Figure 7D:
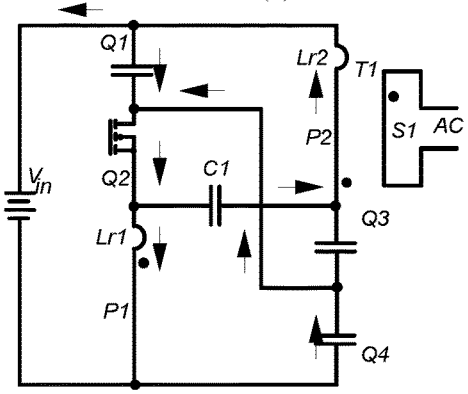

Referring to FIG. 7(d) and [$t_3$-$t_4$] time interval in FIG. 8, the pulse width modulation signal D issued by the controller turns Q1 off at $t_3$, but keeps Q2 on. $i_{Lr2}$ is used to charge $C_{oss1}$ and $i_{Lr1}$ is used to discharge $C_{oss4}$. It increases $V_{ds1}$ to input voltage and decreases $V_{ds4}$ to 0 during this time interval. Due to the forward-biased of body diode of Q4, the transformer primaries P1-P2 are thus shorted and inductance energies are reserved.

Figure 7E:
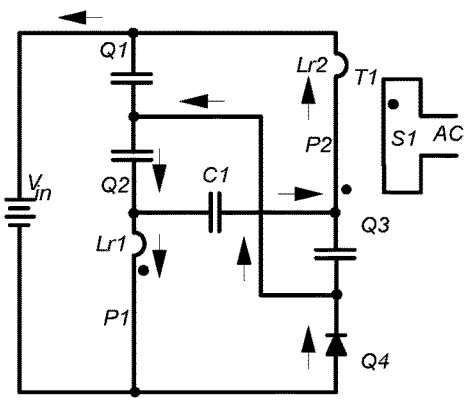

Referring to FIG. 7(e) and [$t_4$-$t_5$] time interval in FIG. 8, $V_{ds1}$=$V_{in}$, $V_{ds2}$=0, $V_{ds3}$=$V_{in}$, and $V_{ds4}$=0 before $t_4$. At $t_4$, the near 50% duty cycle drive signal issued by the controller turns Q2 off. Therefore, $i_{Lr1}$ is used to charge $C_{oss2}$. If inductance energy is large enough and a proper dead-time interval is designed, $V_{ds2}$ will rise to VC1 via the body diode of Q3 and $V_{ds3}$ is decreased to 0. Accordingly, the voltage across primary winding P1-Lr1 increases to Vin resulting in forward-biasing the secondary rectifiers (not shown) to commutate load current. The transformer secondary S1 and transformer primary P1 are thus shorted.

Figure 7F:
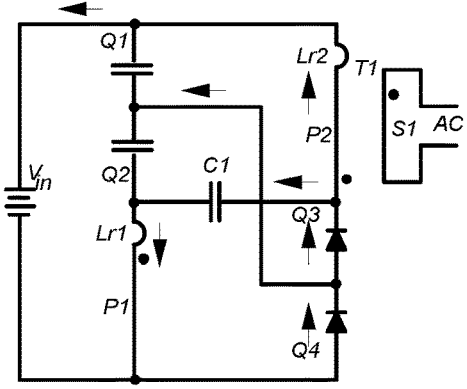

Referring to FIG. 7(f) and [$t_5$-$t_6$] time interval in FIG. 8, $V_{ds1}$=$V_{in}$, $V_{ds2}$=$V_{in}$, $V_{ds3}$=0, $V_{ds4}$=0 before $t_5$. At $t_5$, the drive signals issued by the controller turn-on both Q3 and Q4 under ZVS operation. At $t_6$, the current commutation between two rectifiers is completed.

Figure 7G:
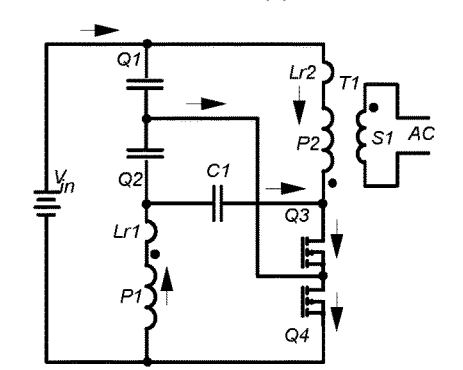

Referring to FIG. 7(g) and [$t_6$-$t_7$] time interval in FIG. 8, both Q3 and Q4 keep turning-on. Two circuit loops, Vin(+)-Lr2-P2-Q3-Q4-Vin(−) and VC1(+)-Q3-Q4-P1-Lr1-VC1(−), are established to provide input voltage to the transformer primaries P1-Lr1 and P2-Lr2, respectively. Input powers are thus transferred to transformer secondary.

Figure 7H:
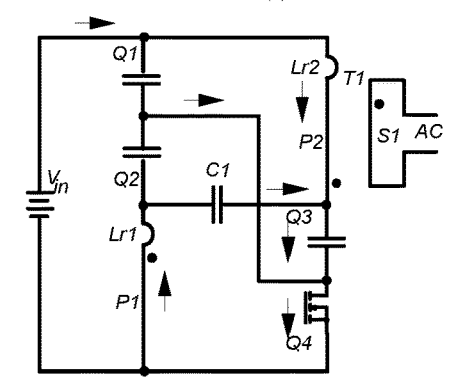

Referring to FIG. 7(h) and [$t_7$-$t_0$] time interval in FIG. 8, the pulse width modulation signal D issued by the controller turns Q3 off at $t_7$, but keeps Q4 on. $i_{Lr1}$ and $i_{Lr2}$ are used to charge $C_{oss3}$ and $V_{ds3}$ will be increased to input voltage and $V_{ds2}$ decreases to 0. Due to the forward-biased of body diode of Q2, the transformer primaries P1-P2 are thus shorted and inductance energies are reserved.

Figure 9A:
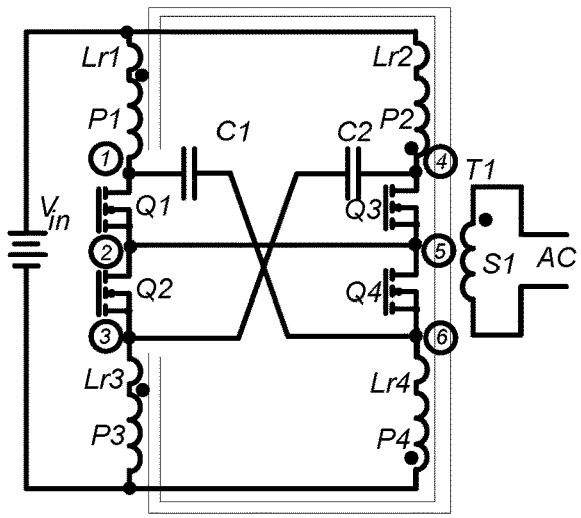
FIG. 9(a) and FIG. 9(b) show a single-transformer DC-AC power inversion circuit diagram with its gate driver timing diagram as the first example of the third embodiment according to the present invention, respectively.

Referring to FIG. 9(a) is a single-transformer DC-AC power inversion circuit as the first example of the third embodiment of the present invention. It comprises two series circuits and two capacitors.

A voltage source Vin provides a DC input to a power inversion circuit. Two series circuits are parallel-connected with the DC input. The first series circuit includes the first primary winding Lr1-P1, the first switch pair Q1-Q2, and the third primary winding Lr3-P3 sequentially connected in series. The second series circuit includes the second primary winding Lr2-P2, the second switch pair Q3-Q4, and the fourth primary winding Lr4-P4 sequentially connected in series. A transformer T1 has two center-tapped winding pairs, P1-P2 and P3-P4, and at least one secondary winding S1. These four primary windings of transformer T1 have equal number of turn. The dot terminals of the first and fourth primary windings (P1 and P4) are connected to the positive and the negative terminals of the DC input voltage Vin, respectively. The non-dot terminals of the second and third primary windings (P2 and P3) are connected to the positive and the negative terminals of the DC input voltage Vin, respectively. A center-node of the first switch pair and a center-node of the second switch pair are connected together. The two terminals of a first capacitor C1 are connected to the non-dot terminals of the first primary winding P1 and fourth primary winding P4, respectively. The two terminals of a second capacitor C2 are connected to the dot terminals of the second primary winding P2 and third primary winding P3, respectively. Moreover, the sum of voltages across Q1-Q4 pair and the Q2-Q3 pair are respectively clamped to $V_{C1}$ and $V_{C2}$. Due to the equal number of turn and opposite polarity of transformer primaries P1-P4 and P2-P3, the average voltage across capacitor C1 or C2 is equal to the DC input voltage.

Figure 9B:
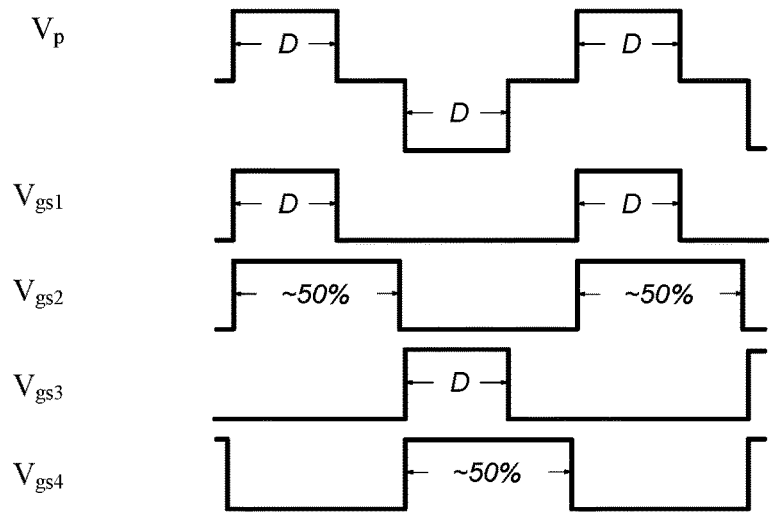

A pulse-width modulation controller will generate two interleaved pairs of gate driver signal applied to the power inversion circuit. Each pair has two synchronized gate driver signals with one pulse-width-modulation signal (D) and one near 50% duty cycle signal (~50%). As shown in FIG. 9(b), four gate driver signals (D, ~50%, D, ~50%) are assigned to turn-on and turn-off the Q1, Q2, Q3, and Q4, respectively. As a result of the sequential operation of Q1, Q2, Q3, and Q4, an AC voltage will be issued that will be available from the secondary winding.

Figure 9C:
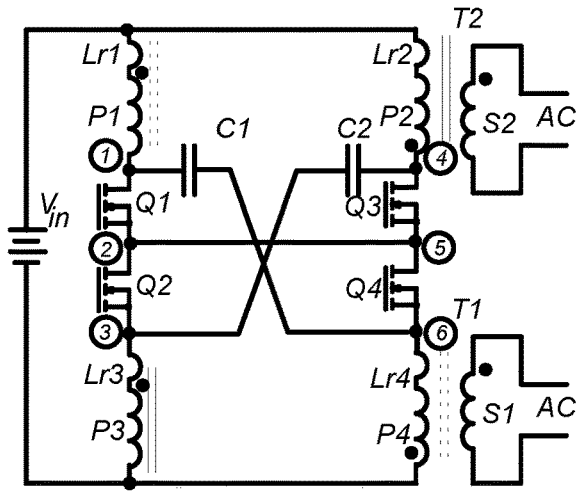
FIG. 9(c) shows a dual-transformer DC-AC power inversion circuit diagram as the second example according to the third embodiment of the present invention.

The second example of the third embodiment to that shown in FIG. 9(a) is depicted in FIG. 9(c). The single transformer T1 has been replaced with dual transformers T1 and T2 for high output power applications. Primary windings P1-P4 and at least one secondary winding S1 are coupled to the first transformer T1 while primary windings P2-P3 and at least one secondary winding S2 are coupled to the second transformer T2. Secondary windings S1 and S2 may be connected in parallel or in series to generate the required AC voltage.

Although the power inversion circuits as shown in FIG. 9(a) and FIG. 9(c) are operated with one or two transformers for different output power applications, these circuits will share the same operating principle with either one of the four different driver signals assigned to the switches as shown in FIG. 2(a) to FIG. 2(d). Accordingly, it will be only described by using the circuit as shown in FIG. 9(a) with driver signals assigned to the switches in FIG. 9(b), the first example of the third embodiment of the present invention.

FIG. 10(a) to FIG. 10(h) show eight equivalent circuits to each operating stages under stead-state operating conditions according to the first example of the third embodiment of the present invention. Several key voltage and current waveforms are obtained by running Simplis program (a computer simulation tool for power electronics circuit) as shown in FIG. 11. It can be seen that all four switches are operated with ZVS. Moreover, only the turn-off of switch Q2 and Q4 (two near 50% control switches) may have shoot-through problem instead of all four switches in phase-shift control scheme.

Figure 10A:
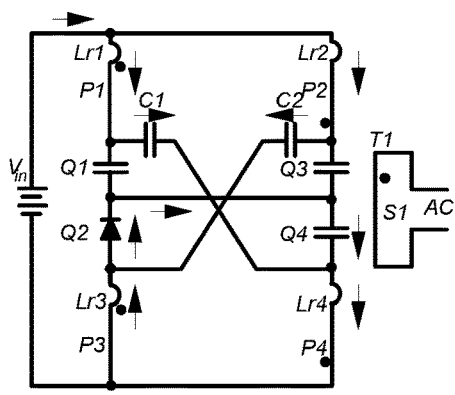
FIG. 10(a) to FIG. 10(h) show eight equivalent circuits of the DC-AC power inversion circuit in FIG. 9(a) under steady-state operating conditions when the switches are turned on and turned off, respectively.
Figure 11:
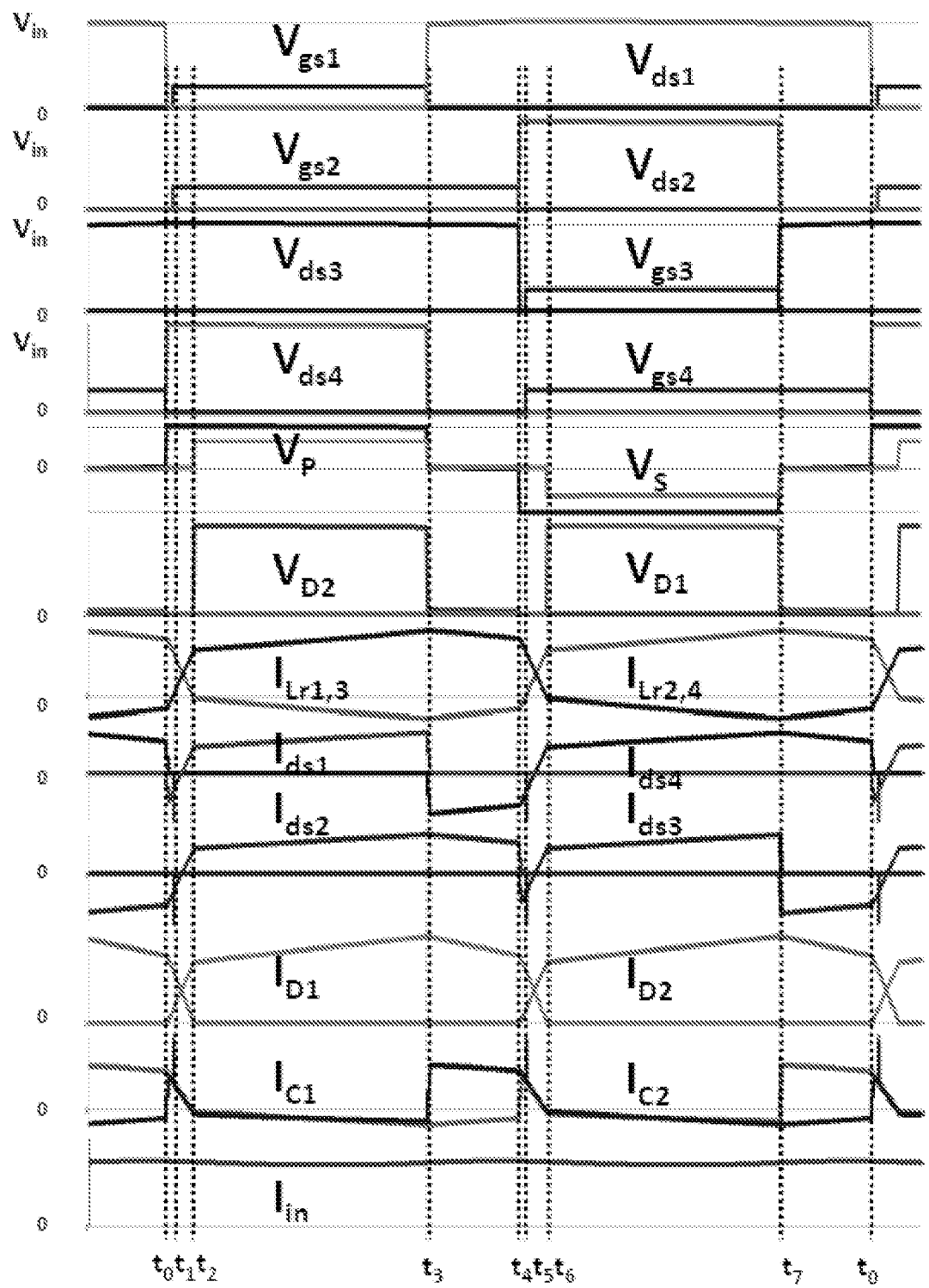
FIG. 11 shows several key voltage and current waveforms of the DC-AC power inversion circuit in FIG. 9(a) under steady state operating conditions.

Referring to FIG. 10(a) and [$t_0$-$t_1$] time interval in FIG. 11, $V_{ds1}$=$V_{in}$, $V_{ds2}$=0, $V_{ds3}$=$V_{in}$, and $V_{ds4}$=0 before $t_0$. At $t_0$, the near 50% duty cycle drive signal issued by the controller turns Q4 off. Therefore, $i_{Lr2}$ and $i_{Lr4}$ are used to charge $C_{oss4}$. If inductance energies are large enough and a proper dead-time interval is designed, $V_{ds4}$ will rise to $V_{in}$ while $V_{ds1}$ is decreased to 0. Accordingly, the sum of the voltage across primary windings P1-Lr1 and P3-Lr3 increases to Vin resulting in forward-biasing the secondary rectifiers (not shown) to commutate load current. Thus, the transformer secondary S1 and transformer primaries (P1 to P4) are shorted. In the mean time, C1 and C2 are also both charged by the input voltage via Vin(+)-Lr1-P1-C1-Lr4-P4-Vin(−) and Vin(+)-Lr2-P2-C2-Lr3-P3-Vin(−), respectively.

Figure 10B:
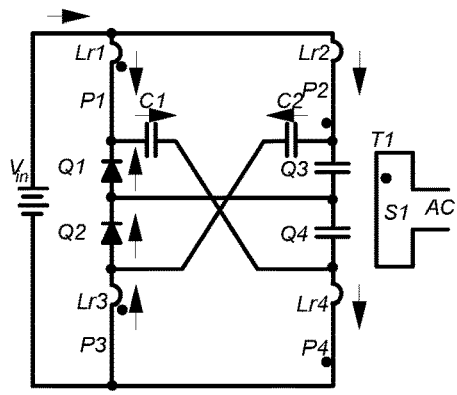

Referring to FIG. 10(b) and [$t_1$-$t_2$] time interval in FIG. 11, $V_{ds1}$=0, $V_{ds2}$=0, $V_{ds3}$=$V_{in}$, and $V_{ds4}$=$V_{in}$ before $t_1$. At $t_1$, the drive signals issued by the controller turn-on both Q1 and Q2 under ZVS operation. At $t_2$, the current commutation between two rectifiers is completed.

Figure 10C:
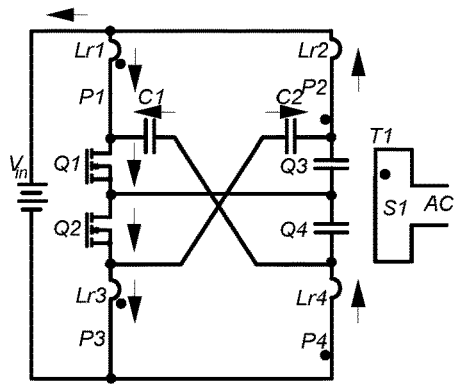

Referring to FIG. 10(c) and [$t_2$-$t_3$] time interval in FIG. 11, both Q1 and Q2 keep turning-on. Three circuit loops, Vin(+)-Lr1-P1-Q1-Q2-Lr3-P3-Vin(−), VC1(+)-Q1-Q2-Lr3-P3-P4-Lr4-VC1(−), and VC2(+)-P2-Lr2-Lr1-P1-Q1-Q2-VC2(−), are established to provide half input voltage to each transformer primaries Lr1-P1 to Lr4-P4, respectively. Input powers are thus transferred to the load via transformer secondary by the DC input voltage $V_{in}$, $V_{C1}$, and $V_{C2}$, respectively.

Figure 10D:
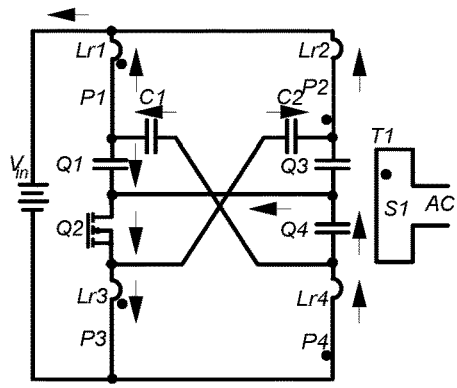

Referring to FIG. 10(d) and [$t_3$-$t_4$] time interval in FIG. 11, the pulse width modulation signal D issued by the controller turns Q1 off at $t_3$, but keeps Q2 on. Inductance energies are used to charge $C_{oss1}$ and discharge $C_{oss4}$. If inductance energies are large enough and a proper dead-time interval is designed, $V_{ds1}$ will rise to Vin and $V_{ds4}$ is decreased to 0. Via $D_{Q4}$-Q2-Lr3-P3-P4-Lr4 loop, the transformer primaries are thus shorted and the inductance energies are reserved.

Figure 10E:
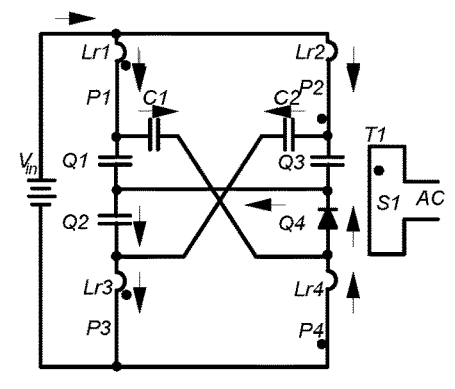

Referring to FIG. 10(e) and [$t_4$-$t_5$] time interval in FIG. 11, $V_{ds1}$=$V_{in}$, $V_{ds2}$=0, $V_{ds3}$=$V_{in}$, and $V_{ds4}$=0 before $t_4$. At $t_4$, the near 50% duty cycle drive signal issued by the controller turns Q2 off. Therefore, $i_{Lr3}$ and $i_{Lr4}$ are used to charge $C_{oss2}$ and $C_{oss3}$ is thus discharged. During this time interval, C1 and C2 are also charged by the input voltage via Vin(+)-Lr1-P1-C1-Lr4-P4-Vin(−) and Vin(+)-Lr2-P2-C2-Lr3-P3-Vin(−), respectively. If inductance energies are large enough and a proper dead-time interval is designed, $V_{ds2}$ will rise to $V_{in}$ via and $V_{ds3}$ is decreased to 0. the sum of the voltage across primary windings P3-Lr3 and P4-Lr4 increases to Vin resulting in forward-biasing the secondary rectifiers (not shown) to commutate load current. The transformer secondary S1 and transformer primary P1 are thus shorted.

Figure 10F:
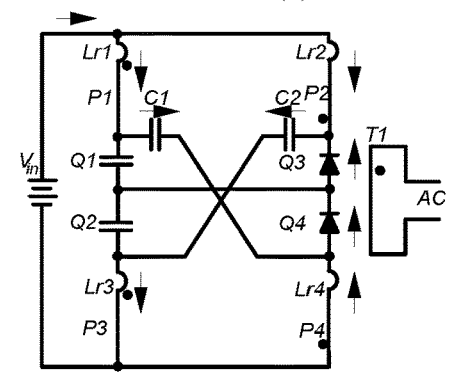

Referring to FIG. 10(f) and [$t_5$-$t_6$] time interval in FIG. 11, $V_{ds1}$=$V_{in}$, $V_{ds2}$=$V_{in}$, $V_{ds3}$=0, $V_{ds4}$=0 before $t_5$. At $t_5$, the drive signals issued by the controller turn-on both Q3 and Q4 under ZVS operation. At $t_6$, the current commutation between two rectifiers is completed.

Figure 10G:
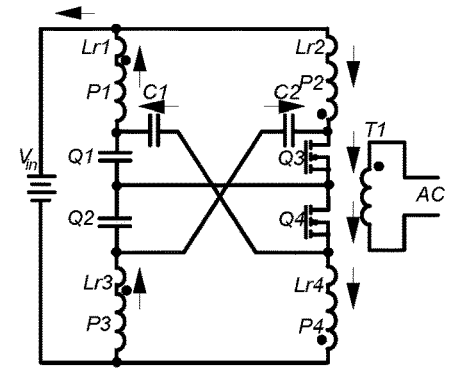

Referring to FIG. 10(g) and [$t_6$-$t_7$] time interval in FIG. 11, both Q3 and Q4 keep turning-on. Three circuit loops, Vin(+)-Lr2-P2-Q3-Q4-Lr4-P4-Vin(−), VC1(+)-P1-Lr1-Lr2-P2-Q3-Q4-VC1(−), and VC2(+)-Q3-Q4-Lr4-P4-P3-Lr3-VC2(−), are established to provide half input voltage to each transformer primaries Lr1-P1 to Lr4-P4, respectively. Input powers are transferred to the load via transformer secondary by the DC input voltage Vin, $V_{C1}$, and $V_{C2}$, respectively.

Figure 10H:
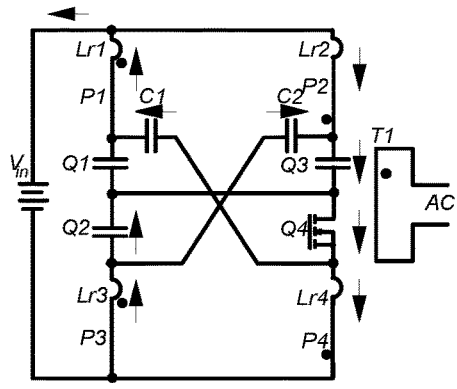

Referring to FIG. 10(h) and [$t_7$-$t_0$] time interval in FIG. 11, the pulse width modulation signal D issued by the controller turns Q3 off at $t_7$, but keeps Q4 on. Inductance energies are used to charge $C_{oss3}$ and discharge $C_{oss2}$. $V_{ds3}$ will rise to Vin and $V_{ds2}$ is decreased to 0. Via $D_{Q2}$-Q4-Lr4-P4-P3-Lr3 loop, the transformer primaries are thus shorted and the inductance energies are reserved.

Figure 12A:
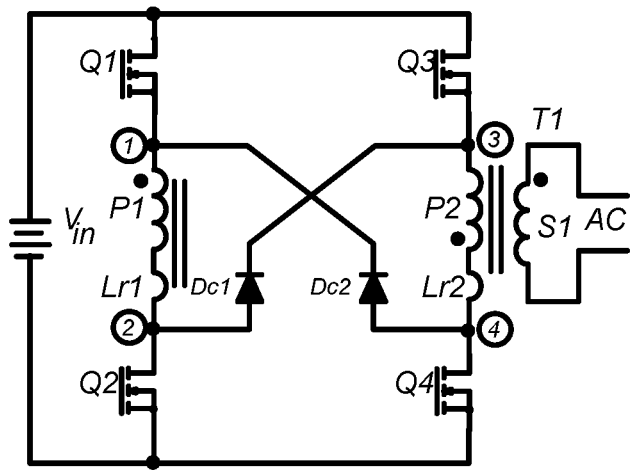
FIG. 12(a) and FIG. 12(b) show a single-transformer DC-AC power inversion circuit diagram with its gate driver timing diagram as the first example of the fourth embodiment according to the present invention, respectively.
Figure 12B:
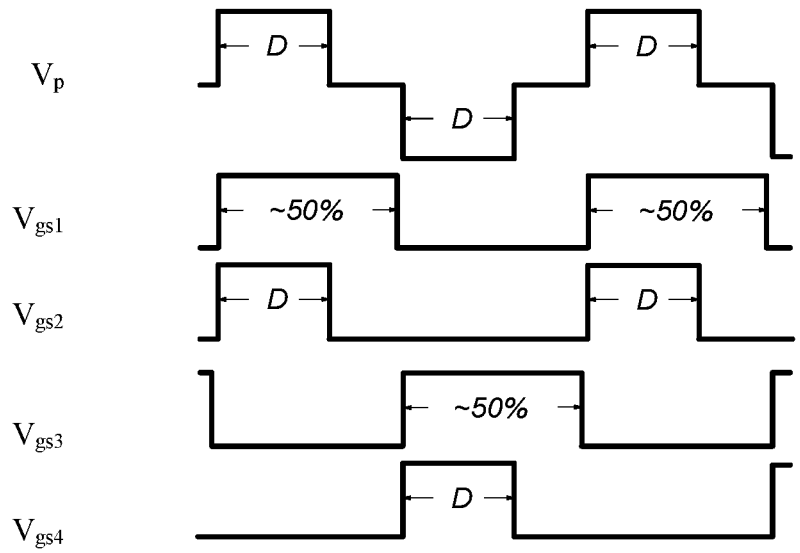

FIG. 12(a) and FIG. 12(b) show a single-transformer DC-AC power inversion circuit with its one of the four driver signal timing diagrams of TT control as shown in FIG. 2(a) to FIG. 2(d) to be assigned to switches as the first example of the fourth embodiment of the present invention. The power inversion circuit comprises two series circuits and two clamping diodes.

Referring to FIG. 12(a), a voltage source Vin provides a DC input to a power inversion circuit which includes two series circuits connected in parallel with the DC input. The first series circuit includes a first switch Q1, a first transformer primary P1-Lr1, and a second switch Q2 sequentially connected in series. The second series circuit includes a third switch Q3, a second transformer primary P2-Lr2, and a fourth switch Q4 sequentially connected in series. A transformer T1 has two transformer primaries (P1-Lr1 and P2-Lr2) and at least one transformer secondary (S1). The primary windings P1-Lr1 and P2-Lr2 have equal number of turn. Lr1 and Lr2 represent the leakage inductance or an individual external inductor to the transformer primaries P1 and P2, respectively. The dot terminals of the first and second primary windings P1-Lr1 and P2-Lr2 are connected to the bottom node of the first switch Q1 and the top node of the fourth switch Q4, respectively. The anode and cathode of a first clamping diode Dc1 are respectively connected to the non-dot terminals of the first transformer primary P1-Lr1 and the second transformer primary P2-Lr2, respectively. The anode and cathode of a second clamping diode Dc2 are respectively connected to the dot terminals of the second transformer primary P2-Lr2 and the first transformer primary P1-Lr1, respectively.

A controller (not shown) will issue two interleaved pairs of gate driver signal applied to the power inversion circuit. Each pair has two synchronized gate driver signals with one pulse-width-modulation signal (D) and one near 50% duty cycle signal (~50%). Referring to FIG. 2(a), FIG. 2(b), FIG.

2(c), and FIG. 2(d), four sets of gate driver signals can be assigned to control the switches. As shown in FIG. 12(b), four gate driver signals (~50%, D, ~50%, D) are assigned to turn-on and turn-off the switches Q1, Q2, Q3, and Q4, respectively. As a result of the sequential operation of Q1, Q2, Q3, and Q4, an AC voltage will be generated that will be available from the secondary winding.

Figure 12C:
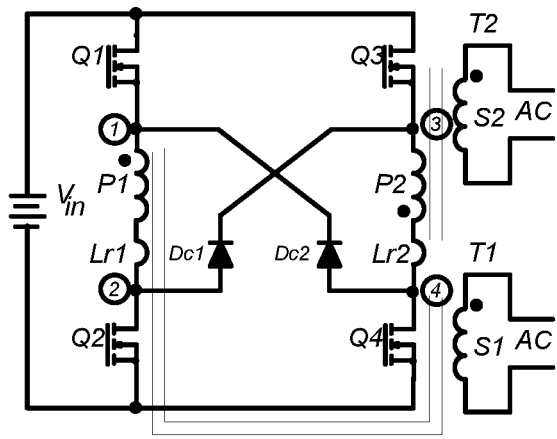
FIG. 12(c) shows a dual-transformer DC-AC power inversion circuit diagram as the second example according to the fourth embodiment of the present invention.

The second example of the fourth embodiment to that shown in FIG. 12(a) is depicted in FIG. 12(c). The single transformer T1 has been replaced with dual transformers T1 and T2 for high output power applications. Primary winding P1-Lr1 and at least one secondary winding S1 are coupled to the first transformer T1 while primary winding P2-Lr2 and at least one secondary winding S2 are coupled to the second transformer T2. Secondary windings S1 and S2 may be connected in parallel or in series to generate the required AC voltage.

Although the power inversion circuits as shown in FIG. 12(a) and FIG. 12(c) are operated with one or two transformers for different output power applications, these circuits will share the same operating principle with either one of the four different driver signals assigned to the switches as shown in FIG. 2(a) to FIG. 2(d). Accordingly, it will be only described by using the circuit as shown in FIG. 12(a) with driver signals assigned to the switches in FIG. 12(d), the first example of the fourth embodiment of the present invention.

FIG. 13(a) to FIG. 13(h) show eight equivalent circuits to each operating stages under stead-state operating conditions according to the first example of the fourth embodiment of the present invention. Several key voltage and current waveforms are obtained by running Simplis program (a computer simulation tool for power electronics circuit) as shown in FIG. 14. It can be seen that all four switches are operated with ZVS and there is no shoot-through problem instead of all four switches in phase-shift control scheme.

Figure 13A:
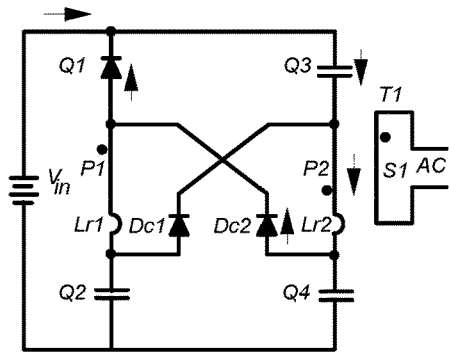
FIG. 13(a) to FIG. 13(h) show eight equivalent circuits of the DC-AC power inversion circuit in FIG. 12(a) under steady-state operating conditions when the switches are turned on and turned off, respectively.
Figure 14:
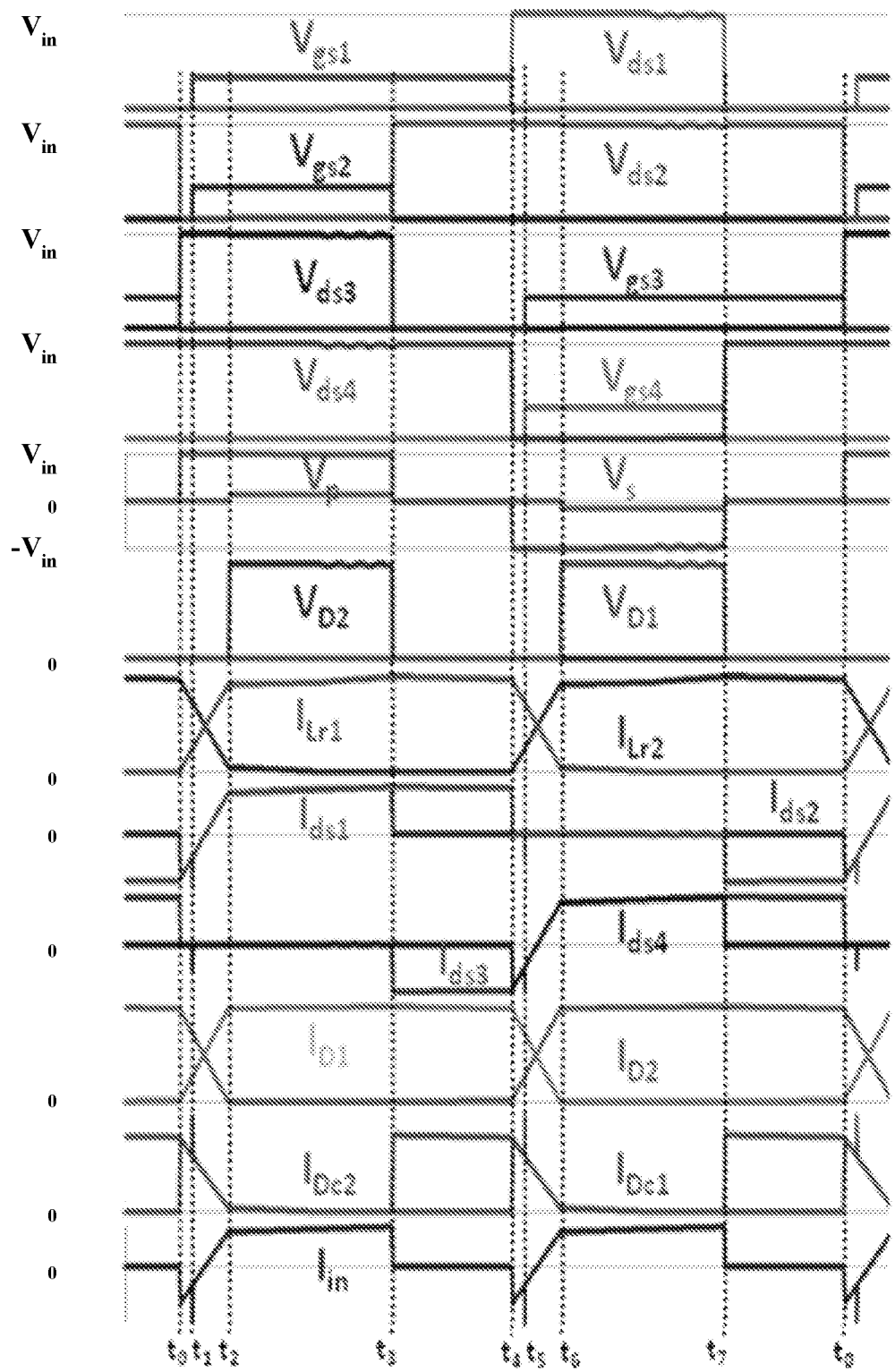
FIG. 14 shows several key voltage and current waveforms of the DC-AC power inversion circuit in FIG. 12(a) under steady state operating conditions.

Referring to FIG. 13(a) and [$t_0$-$t_1$] time interval in FIG. 14, $V_{ds1}$=0, $V_{ds2}$=$V_{in}$, $V_{ds3}$=0, and $V_{ds4}$=$V_{in}$ before $t_0$. At $t_0$, the near 50% duty cycle drive signal issued by the controller turns Q3 off. Therefore, $i_{Lr2}$ is used to charge $C_{oss3}$ via Dc2. If inductance energy is large enough and a proper dead-time interval is designed, $V_{ds3}$ will rise to Vin and $V_{ds2}$ is decreased to 0. Accordingly, the voltage across primary winding P1-Lr1 increases to Vin resulting in forward-biasing the secondary rectifiers (not shown) to commutate load current. The transformer secondary S1 and transformer primary P1 are thus shorted.

Figure 13B:
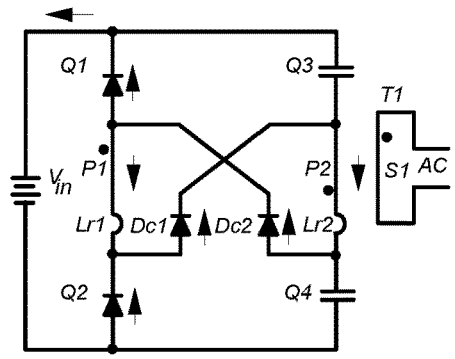

Referring to FIG. 13(b) and [$t_1$-$t_2$] time interval in FIG. 14, $V_{ds1}$=0, $V_{ds2}$=0, $V_{ds3}$=Vin, and $V_{ds4}$=$V_{in}$ before $t_1$. At $t_1$, the drive signals issued by the controller turn-on both Q1 and Q2 under ZVS operation. At $t_2$, the current commutation between two rectifiers is completed.

Figure 13C:
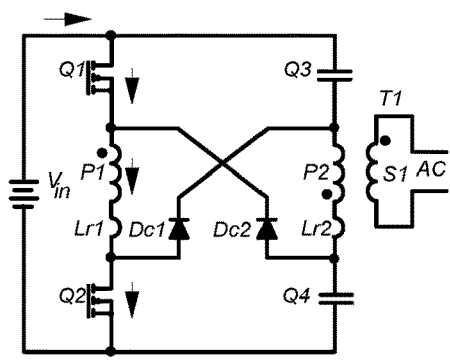

Referring to FIG. 13(c) and [$t_2$-$t_3$] time interval in FIG. 14, both Q1 and Q2 keep turning-on. Vin(+)-Q1-P1-Lr1-Q2-Vin(−) is established to provide input voltage to the transformer primary P1-Lr1. Input powers are thus transferred to transformer secondary.

Figure 13D:
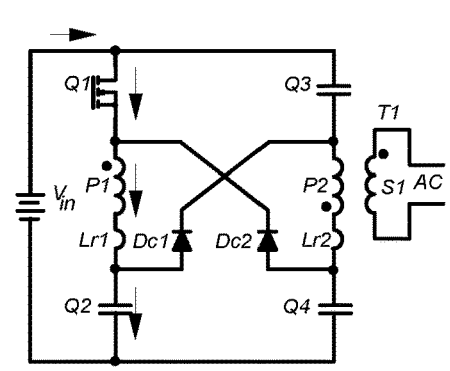

Referring to FIG. 13(d) and [$t_3$-$t_4$] time interval in FIG. 14, the pulse width modulation signal D issued by the controller turns Q2 off at $t_3$, but keeps Q1 on. $i_{Lr1}$ is used to charge $C_{oss2}$. $V_{ds2}$ rises to input voltage and $V_{ds3}$ decreases to 0. Due to the forward-biased of body diode of Q3, the transformer primaries are thus shorted and the Lr1 energy is reserved.

Figure 13E:
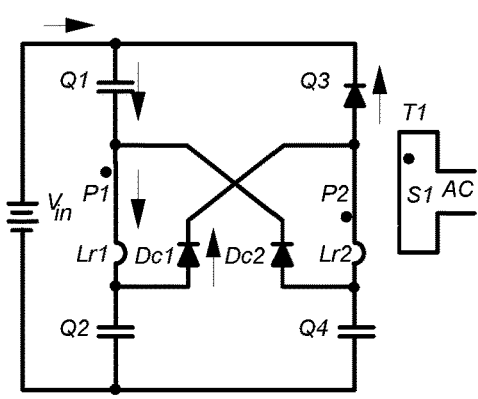

Referring to FIG. 13(e) and [$t_4$-$t_5$] time interval in FIG. 14, $V_{ds1}$=0, $V_{ds2}$=$V_{in}$, $V_{ds3}$=0, and $V_{ds4}$=$V_{in}$ before $t_4$. At $t_4$, the near 50% duty cycle drive signal issued by the controller turns Q1 off. Therefore, $i_{Lr1}$ is used to charge $C_{oss1}$. If inductance energy is large enough and a proper dead-time interval is designed, $V_{ds1}$ will rise to Vin and $V_{ds4}$ is decreased to 0. Accordingly, the voltage across primary winding P2-Lr2 increases to Vin resulting in forward-biasing the secondary rectifiers (not shown) to commutate load current. The transformer secondary S1 and transformer primaries P1-P2 are thus shorted.

Figure 13F:
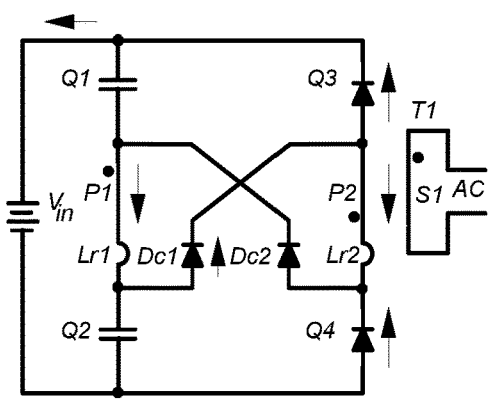

Referring to FIG. 13(f) and [$t_5$-$t_6$] time interval in FIG. 14, $V_{ds1}$=$V_{in}$, $V_{ds2}$=$V_{in}$, $V_{ds3}$=0, $V_{ds4}$=0 before $t_5$. At $t_5$, the drive signals issued by the controller turn-on both Q3 and Q4 under ZVS operation. At $t_6$, the current commutation between two rectifiers is completed.

Figure 13G:
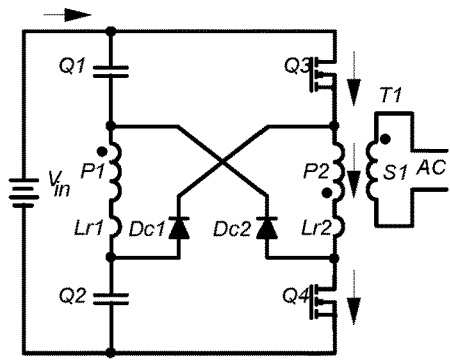

Referring to FIG. 13(g) and [$t_6$-$t_7$] time interval in FIG. 14, both Q3 and Q4 keep turning-on. Vin(+)-Q3-P2-Lr2-Q4-Vin(−) is established to provide input voltage to the second transformer primary P2-Lr2. Input powers are thus transferred to transformer secondary.

Figure 13H:
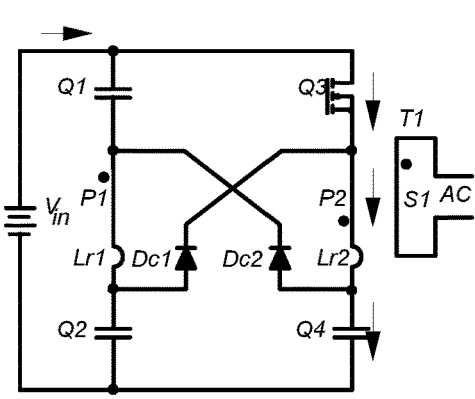

Referring to FIG. 13(h) and [$t_7$-$t_0$] time interval in FIG. 14, the pulse width modulation signal D issued by the controller turns Q4 off at $t_7$, but keeps Q3 on. $i_{Lr2}$ is used to charge $C_{oss4}$. If inductance energy is large enough and a proper dead-time interval is designed, $V_{ds4}$ will rise to Vin and $V_{ds1}$ is decreased to 0. Due to the forward-biased of Dc1, the transformer primaries are thus shorted and the Lr2 energy is reserved.

Figure 15A:
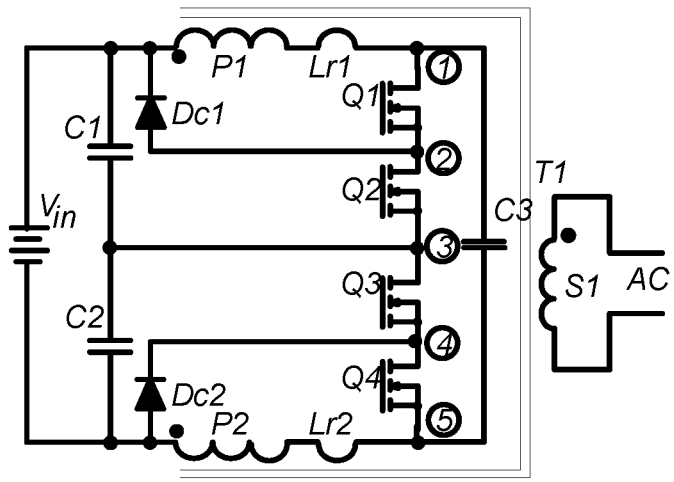
FIG. 15(a) and FIG. 15(b) show a single-transformer DC-AC power inversion circuit diagram with its gate driver timing diagram as the first example of the fifth embodiment according to the present invention, respectively.
Figure 15B:
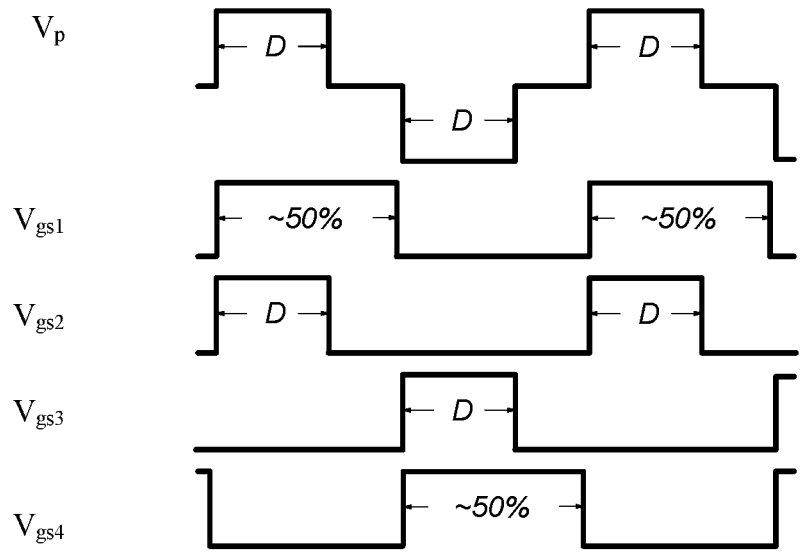

FIG. 15(a) and FIG. 15(b) respectively show a single-transformer DC-AC power inversion circuit with its driver signal timing diagram to be assigned to switches as the first example of the fifth embodiment of the present invention. The power inversion circuit comprises three series circuits and two clamping diodes.

Referring to FIG. 15(a), a voltage source Vin provides a DC input to a power inversion circuit which includes three series circuits and two clamping diodes. A first series circuit connected in parallel with the DC input and includes a first capacitor C1 and a second capacitor C2 sequentially connected in series. A second series circuit connected in parallel with said DC input and includes a first transformer primary P1-Lr1, a third capacitor C3, and a second transformer primary Lr2-P2 sequentially connected in series. A dot node of the first transformer primary P1-Lr1 and a dot node of the second transformer primary Lr2-P2 are respectively connected to the positive terminal and the negative terminal of the DC input source. The transformer primaries P1 and P2 have equal number of turn and opposite polarity within the second series circuit, the average voltage across the third capacitor $V_{C3}$ is thus equal to the DC input voltage $V_{in}$. A first switch-pair includes a first switch Q1 and a second switch Q2 sequentially connected in series. A second switch-pair includes a third switch Q3 and a fourth switch Q4 sequentially connected in series. A third series circuit connected in parallel with the third capacitor C3 including the first switch-pair Q1-Q2 and the second switch-pair Q3-Q4 sequentially connected in series. A center node of the first capacitor C1 and the second capacitor C2 within the first series circuit is connected to a center node of the first switch-pair Q1-Q2 and the second switch-pair Q3-Q4 within the third series circuit. An anode node and a cathode node of a first diode Dc1 are respectively connected to a center node of the first switch-pair Q1-Q2 and a positive node of the DC input. An anode node and a cathode node of a second diode Dc2 are respectively connected to a negative node of the DC input and a center node of the second switch-pair Q3-Q4. At least a first secondary S1, the first transformer primary P1-Lr1, and the second transformer primary Lr2-P2 are magnetically coupled to a first transformer T1 provide the AC voltage.

A controller (not shown) will issue two interleaved pairs of gate driver signal applied to the power inversion circuit. Each pair has two synchronized gate driver signals with one pulse-width-modulation signal (D) and one near 50% duty cycle signal (~50%). As shown in FIG. 15(b), four gate driver signals (~50%, D, D, ~50%) are assigned to turn-on and turn-off the switches Q1, Q2, Q3, and Q4, respectively. As a result of the sequential operation of Q1, Q2, Q3, and Q4, an AC voltage will be generated that will be available from the secondary winding.

Figure 15C:
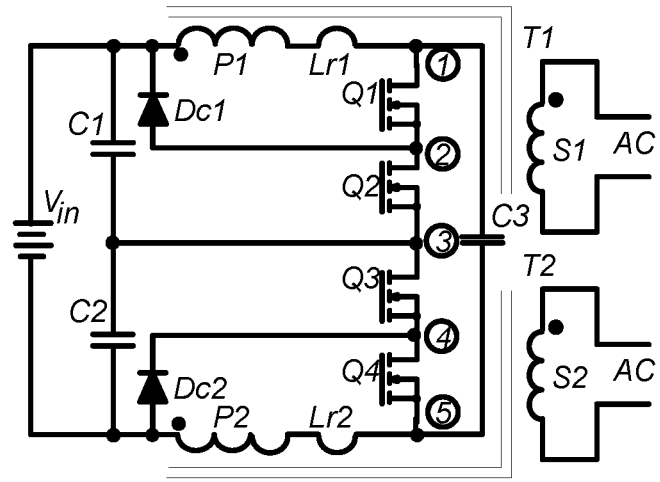
FIG. 15(c) shows a dual-transformer DC-AC power inversion circuit diagram as the second example according to the fifth embodiment of the present invention.

The second example of the fifth embodiment to that shown in FIG. 15(a) is depicted in FIG. 15(c). The single transformer T1 has been replaced with dual transformers T1 and T2 for high output power applications. Primary winding P1-Lr1 and at least one secondary winding S1 are coupled to the first transformer T1 while primary winding Lr2-P2 and at least one secondary winding S2 are coupled to the second transformer T2. Secondary windings S1 and S2 may be connected in parallel or in series to generate the required AC voltage.

Although the power inversion circuits as shown in FIG. 15(a) and FIG. 15(c) are operated with one or two transformers for different output power applications, both circuits will share the same operating principle with four driver signals assigned to the switches as shown in FIG. 15(b). Accordingly, it will be only described by using the circuit in FIG. 15(a) with driver signals assigned to the switches in FIG. 15(b), the first example of the fifth embodiment of the present invention.

FIG. 16(a) to FIG. 16(h) show eight equivalent circuits to each operating stages under stead-state operating conditions according to the first example of the fifth embodiment of the present invention. Several key voltage and current waveforms are obtained by running Simplis program (a computer simulation tool for power electronics circuit) as shown in FIG. 17. It can be seen that all four switches are operated with ZVS and there is no shoot-through problem instead of all four switches in phase-shift control scheme.

Figure 16A:
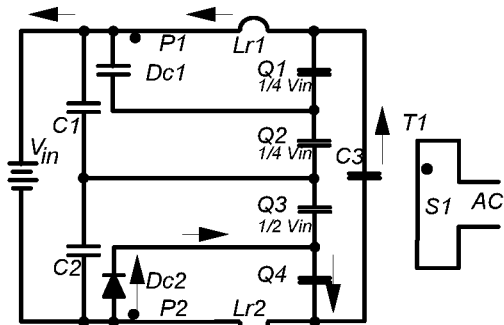
FIG. 16(a) to FIG. 16(h) show eight equivalent circuits of the DC-AC power inversion circuit in FIG. 15(a) under steady-state operating conditions when the switches are turned on and turned off, respectively.
Figure 17:
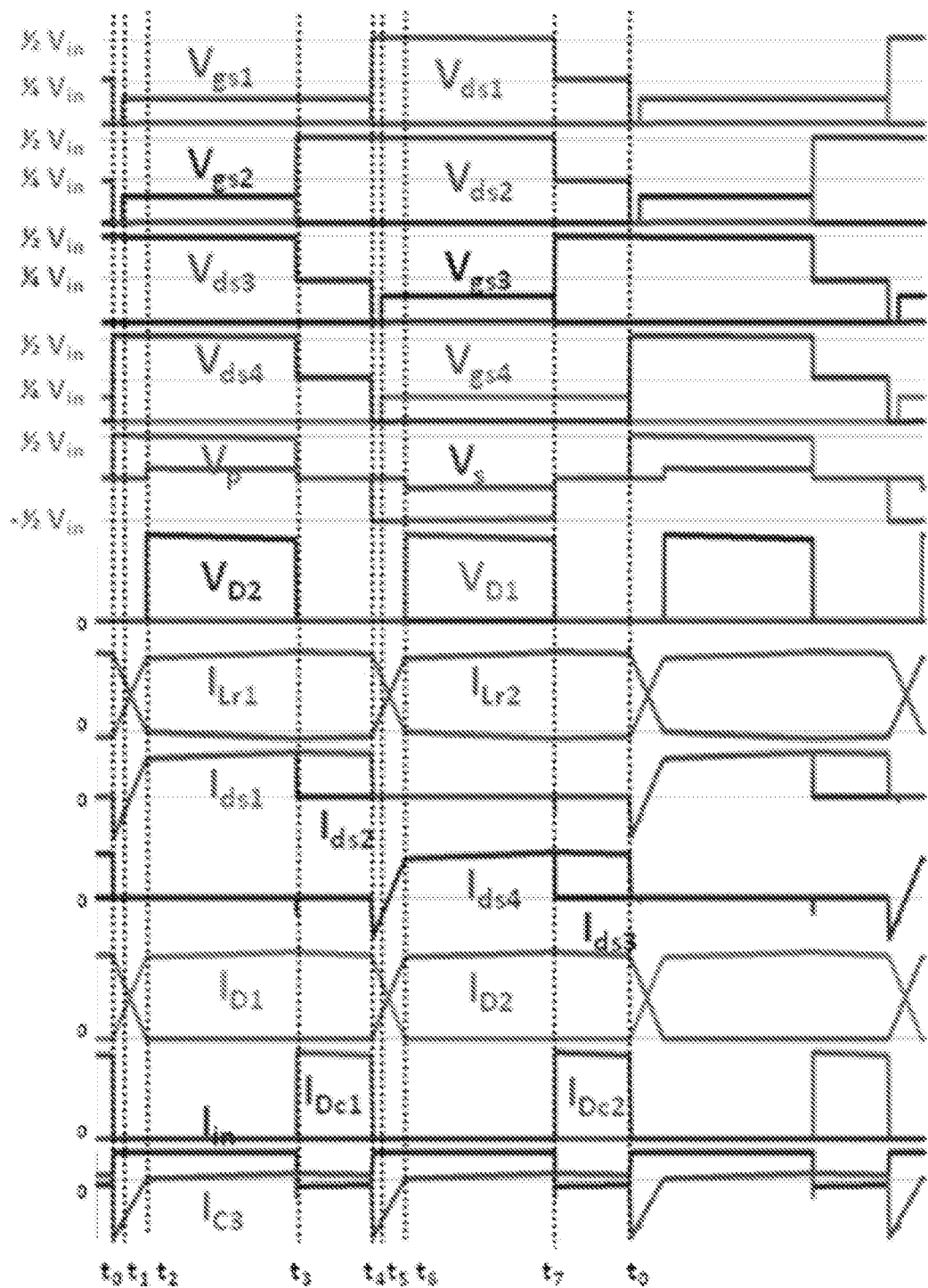
FIG. 17 shows several key voltage and current waveforms of the DC-AC power inversion circuit in FIG. 15(a) under steady state operating conditions.

Referring to FIG. 16(a) and [$t_0$-$t_1$] time interval in FIG. 17, $V_{ds1}$=$V_{ds2}$=¼ $V_{in}$, $V_{ds3}$=½ $V_{in}$, and $V_{ds4}$=0 before $t_0$. At $t_0$, the near 50% duty cycle drive signal issued by the controller turns Q4 off. Therefore, $i_{Lr2}$ is used to charge $C_{oss4}$ and $i_{Lr1}$ is used to discharge $C_{oss1}$ and $C_{oss2}$. If inductance energy is large enough and a proper dead-time interval is designed, $V_{ds4}$ will rise to ½ $V_{in}$ resulting in decreasing $V_{ds1}$ and $V_{ds2}$ to 0. Accordingly, the voltage across primary winding P1-Lr1 increases to ½ Vin resulting in forward-biasing the secondary rectifiers (not shown) to commutate load current. The transformer secondary S1 and transformer primaries P1-P2 are thus shorted.

Figure 16B:
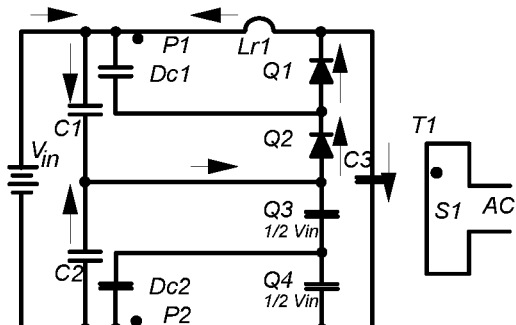

Referring to FIG. 16(b) and [$t_1$-$t_2$] time interval in FIG. 17, $V_{ds1}$=0, $V_{ds2}$=0, $V_{ds3}$=½ $V_{in}$ and $V_{ds4}$=½ $V_{in}$ before $t_1$. At $t_1$, the drive signals issued by the controller turn-on both Q1 and Q2 under ZVS operation. At $t_2$, the current commutation between two rectifiers is completed.

Figure 16C:
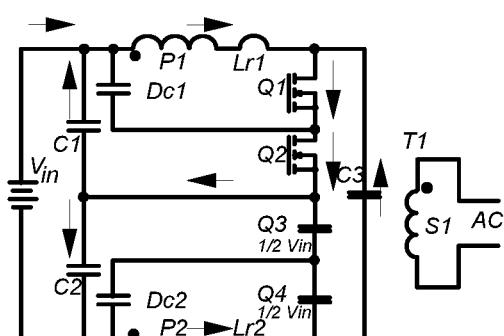

Referring to FIG. 16(c) and [$t_2$-$t_3$] time interval in FIG. 17, both Q1 and Q2 keep turning-on. Three loops, Vin(+)-P1-Lr1-Q1-Q2-C2-Vin(−), Vc1(+)-P1-Lr1-Q1-Q2-Vc1(−), and Vc3(+)-Q1-Q2-C2-P2-Lr2-Vc3(−) are established to provide input voltage to the transformer primaries P1-Lr1 and P2-Lr2. The voltage across transformer primaries P1 and P2 are provided with half DC input voltage ½ Vin. Input powers are thus transferred to transformer secondary.

Figure 16D:
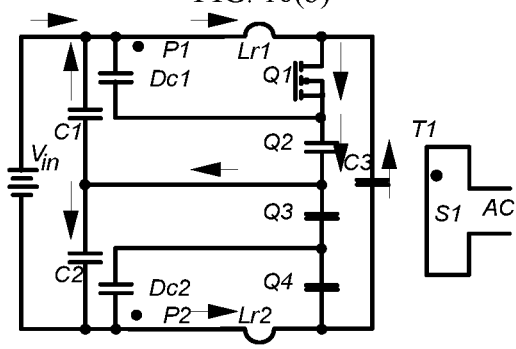

Referring to FIG. 16(d) and [$t_3$-$t_4$] time interval in FIG. 17, the pulse width modulation signal D issued by the controller turns Q2 off at $t_3$, but keeps Q1 on. $i_{Lr1}$ is used to charge $C_{oss2}$ and $I_{Lr2}$ is used to discharge $C_{oss3}$ and $C_{oss4}$. $V_{ds2}$ will rise to ½ $V_{in}$ and $V_{ds3}$=$V_{ds4}$=¼ $V_{in}$. Due to the forward-biased of Dc1, the transformer primary P1 is thus shorted and the Lr1 energy is reserved.

Figure 16E:
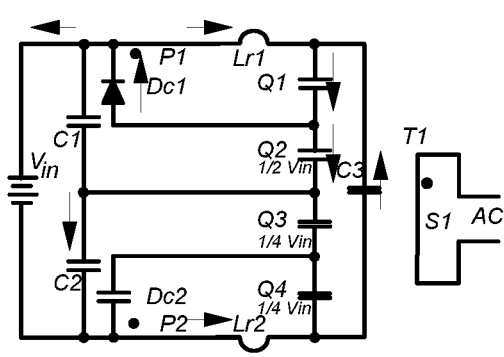

Referring to FIG. 16(e) and [$t_4$-$t_5$] time interval in FIG. 17, $V_{ds1}$=0, $V_{ds2}$=½ $V_{in}$, and $V_{ds3}$=$V_{ds4}$=¼ $V_{in}$ before $t_4$. At $t_4$, the near 50% duty cycle drive signal issued by the controller turns Q1 off. Therefore, $i_{Lr1}$ is used to charge $C_{oss1}$ and $i_{Lr2}$ is used to discharge $C_{oss3}$ and $C_{oss4}$. If inductance energies are large enough and a proper dead-time interval is designed, $V_{ds1}$ will rise to ½ $V_{in}$ resulting in decreasing both $V_{ds3}$ and $V_{ds4}$ to 0 before $t_5$.

Figure 16F:
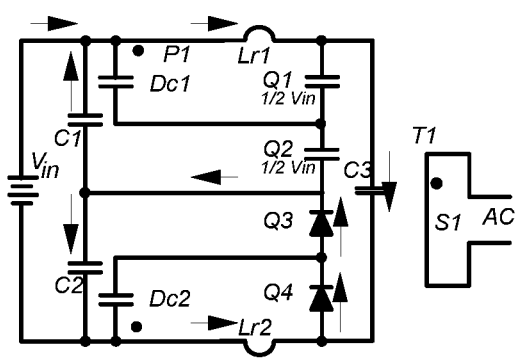

Referring to FIG. 16(f) and [$t_5$-$t_6$] time interval in FIG. 17, $V_{ds1}$=½ $V_{in}$, $V_{ds2}$=½ $V_{in}$, $V_{ds3}$=0, $V_{ds4}$=0 before $t_5$. At $t_5$, the drive signals issued by the controller turn-on both Q3 and Q4 under ZVS operation. At $t_6$, the current commutation between two rectifiers is completed.

Figure 16G:
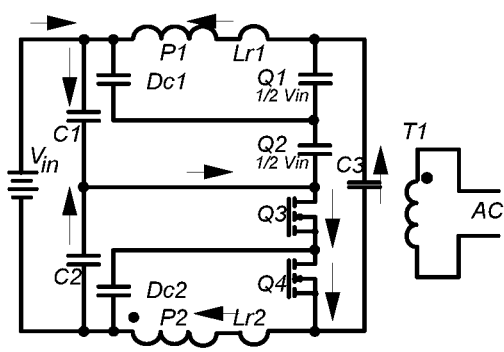

Referring to FIG. 16(g) and [$t_6$-$t_7$] time interval in FIG. 17, both Q3 and Q4 keep turning-on. Three loops, Vin(+)-C1-Q3-Q4-Lr2-P2-Vin(−), Vc2(+)-Q3-Q4-Lr2-P2-Vc2(−), and Vc3(+)-Lr1-P1-C1-Q3-Q4-Vc3(−) are established to provide input voltage to the transformer primaries P1-Lr1 and P2-Lr2. The voltage across transformer primaries P1 and P2 are provided with half DC input voltage ½ Vin. Input powers are thus transferred to transformer secondary.

Figure 16H:
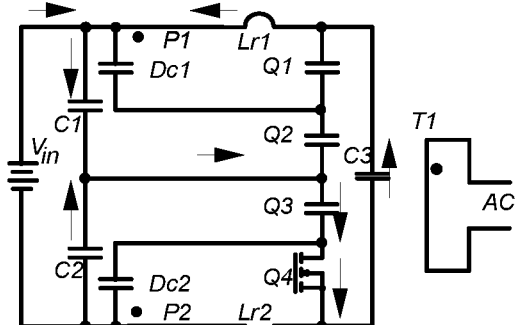

Referring to FIG. 16(h) and [$t_7$-$t_0$] time interval in FIG. 17, the pulse width modulation signal D issued by the controller turns Q3 off at $t_7$, but keeps Q4 on. $i_{Lr2}$ is used to charge $C_{oss3}$ and $I_{Lr1}$ is used to discharge $C_{oss1}$ and $C_{oss2}$. $V_{ds3}$ will rise and be clamped to ½ $V_{in}$ and $V_{ds1}$=$V_{ds2}$=¼ $V_1$. Due to the forward-biased of Dc2, the transformer primary P2 is thus shorted and the Lr2 energy is reserved.

While the invention has been described in detail herein in accordance with certain preferred embodiments thereof. However, the present invention is not limited to this. Therefore, anyone familiar with the art can easily think of the aforementioned equivalent changes or modifications in the field of the invention. For example, the MOSFET used as the semiconductor switching devices can also implement with other newly developed or equivalent functional elements according to their applications. Moreover, the diode used as the rectifier can also implement with the MOSFET or equivalent functional elements according to their applications. Accordingly, it is intended by the appended claims to cover all such modifications and changes as fall within the true spirit and scope of the invention.

What is claimed is:

1. A soft-switching power inversion circuit for converting a DC voltage received at a DC input to an AC voltage, which is paralleled-connected to the DC input, and includes:
   a first series circuit connected in parallel with said DC input and includes a first switch, a first transformer primary, and a second switch sequentially connected in series;
   a second series circuit connected in parallel with said DC input and includes a third switch, said first transformer primary, and a fourth switch sequentially connected in series;
   at least a first transformer secondary and said first transformer primary are magnetically coupled to a first transformer to provide said AC voltage;
   a dot node of said first transformer primary, a bottom node of said first switch, and a top node of said fourth switch are connected together;

a non-dot node of said first transformer primary, a bottom node of said third switch, and a top node of said second switch are connected together;
a first driver signal pair includes a first pulse-width modulation driver signal and a first near 50% duty cycle driver signal used to turn-on and turn-off said first switch and said second switch in the first series circuit;
a second driver signal pair includes a second pulse-width modulation driver signal and a second near 50% duty cycle driver signal used to turn-on and turn-off said third switch and said fourth switch in the second series circuit;
said two driver signals of the first driver signal pair and said two driver signals of the second driver signal pair are synchronous to each other with 180 degree phase-shift.

2. A soft-switching power inversion circuit for converting a DC voltage received at a DC input to an AC voltage, which is paralleled-connected to the DC input, and includes:
a first series circuit connected in parallel with said DC input, including a first switch, a second switch and a first transformer primary sequentially connected in series;
a second series circuit connected in parallel with said DC input, including a second transformer primary, a third switch and a fourth switch sequentially connected in series;
a top node of said first switch and a non-dot node of said second transformer primary are connected to a positive terminal said DC input;
a non-dot of said first transformer primary and a bottom node of said fourth switch are connected to a negative terminal of said DC input;
a first capacitor connected between a second node within said first series circuit and a third node within said second series circuit, wherein said second node is between a bottom node of said second switch and a dot node of said first transformer primary, and wherein said third node is between a dot node of said second transformer primary and a top node of said third switch;
a center node between said first switch and said second switch is connected to a center node between said third switch and said fourth switch;
a first driver signal pair includes a first pulse-width modulation driver signal and a first near 50% duty cycle driver signal used to turn-on and turn-off said first switch and said second switch in said first series circuit;
a second driver signal pair includes a second pulse-width modulation driver signal and a second near 50% duty cycle driver signal used to turn-on and turn-off said third switch and said fourth switch in said second series circuit;
said two driver signals of said first driver signal pair and said two driver signals of said second driver signal pair are synchronous to each other with 180 degree phase-shift.

3. The soft-switching power inversion circuit as claimed in claim 2, wherein said first transformer primary, said second transformer primary and at least a first transformer secondary are magnetically coupled to a first transformer to provide said AC voltage.

4. The soft-switching power inversion circuit as claimed in claim 2, wherein said first transformer primary and at least a first transformer secondary are magnetically coupled to a first transformer to provide said AC voltage, and wherein said second transformer primary and at least a second transformer secondary are magnetically coupled to a second transformer to provide said AC voltage.

5. A soft-switching power inversion circuit for converting a DC voltage received at a DC input to an AC voltage, which is paralleled-connected to the DC input, and includes:
a first series circuit connected in parallel with said DC input, including a first switch, a first transformer primary, and a second switch sequentially series-connected,
a second series circuit connected in parallel with said DC input, including a third switch, a second transformer primary, and a fourth switch sequentially series-connected;
at least said first transformer primary and at least a first transformer secondary are magnetically coupled to at least a first transformer to provide said AC voltage;
a first clamping diode, wherein an anode node and a cathode node of said first clamping diode are respectively connected to a second node within said first series circuit and a third node within said second series circuit, wherein said second node is between a non-dot node of said first transformer primary and a top node of said second switch, and wherein said third node is between a bottom node of said third switch and a non-dot node of said second transformer primary;
a second clamping diode, wherein an anode node and a cathode node of said second clamping diode are respectively connected to a fourth node within said second series circuit and a first node within said first series circuit, wherein said fourth node is between a dot node of said second transformer primary and a top node of said fourth switch, and said first node is between a bottom node of said first switch and a dot node of said first transformer primary;
a first driver signal pair includes a first pulse-width modulation driver signal and a first near 50% duty cycle driver signal used to turn-on and turn-off said first switch and said second switch in said first series circuit; and
a second driver signal pair includes a second pulse-width modulation driver signal and a second near 50% duty cycle driver signal used to turn-on and turn-off said third switch and said fourth switch in said second series circuit;
wherein said two driver signals of said first driver signal pair and said two driver signals of said second driver signal pair are synchronous to each other with 180 degree phase-shift.

6. The soft-switching power inversion circuit as claimed in claim 5, wherein said first transformer primary, said second transformer primary and at least said first transformer secondary are magnetically coupled to said first transformer to provide said AC voltage.

7. The soft-switching power inversion circuit as claimed in claim 5, wherein said first transformer primary and at least said first transformer secondary are magnetically coupled to said first transformer to provide said AC voltage, further including at least a second transformer secondary, and wherein said second transformer primary and at least said second transformer secondary are magnetically coupled to a second transformer to provide said AC voltage.

8. A soft-switching power inversion circuit for converting a DC voltage received at a DC input to an AC voltage, which is paralleled-connected to the DC input, and includes:
a first series circuit connected in parallel with said DC input and includes a first capacitor and a second capacitor sequentially connected in series;

a second series circuit connected in parallel with said DC input and includes a first transformer primary, a third capacitor, and a second transformer primary sequentially connected in series, wherein a dot node of said first transformer primary and a dot node of said second transformer primary are respectively connected to a a positive terminal and a negative terminal of said DC input;

at least a first transformer secondary, wherein said first transformer primary and at least said first transformer secondary are magnetically coupled to at least a first transformer to provide said AC voltage;

a first switch-pair includes a first switch and a second switch sequentially connected in series;

a second switch-pair includes a third switch and a fourth switch sequentially connected in series;

a third series circuit connected in parallel with said third capacitor including said first switch-pair and said second switch-pair sequentially connected in series;

a center node of said first capacitor and said second capacitor within said first series circuit is connected to a center node of said first switch-pair and said second switch-pair within said third series circuit;

an anode node and a cathode node of a first diode are respectively connected to a center node of said first switch-pair and a positive node of said DC input;

an anode node and a cathode node of a second diode are respectively connected to a negative node of said DC input and a center node of said second switch-pair;

a first driver signal pair includes a first near 50% duty cycle driver signal and a first pulse-width modulation driver signal used to respectively turn-on and turn-off said first switch and said second switch in the first switch pair;

a second driver signal pair includes a second pulse-width modulation driver signal and a second near 50% duty cycle driver signal used to respectively turn-on and turn-off said third switch and said fourth switch in the second switch pair;

said two driver signals of said first driver signal pair and said two driver signals of said second driver signal pair are synchronous to each other with 180 degree phase-shift.

9. The soft-switching power inversion circuit as claimed in claim 8, wherein said first transformer primary, said second transformer primary and at least said first transformer secondary are magnetically coupled to said first transformer to provide said AC voltage.

10. The soft-switching power inversion circuit as claimed in claim 8, further including at least a second transformer secondary, wherein said first transformer primary and at least said first transformer secondary are magnetically coupled to said first transformer to provide said AC voltage, and wherein said second transformer primary and at least said second transformer secondary are magnetically coupled to a second transformer to provide said AC voltage.

* * * * *